US011530374B2

(12) United States Patent
Butterfield et al.

(10) Patent No.: US 11,530,374 B2
(45) Date of Patent: Dec. 20, 2022

(54) LAUNDRY CARE COMPOSITIONS

(71) Applicant: MILLIKEN & COMPANY, Spartanburg, SC (US)

(72) Inventors: Benjamin R. Butterfield, Greer, SC (US); Eduardo Torres, Greer, SC (US); Sanjeev K. Dey, Spartanburg, SC (US); Michael Hong, Greer, SC (US); Haihu Qin, Greer, SC (US); Dominick J. Valenti, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 1116 days.

(21) Appl. No.: 14/704,154

(22) Filed: May 5, 2015

(65) Prior Publication Data
US 2015/0322384 A1 Nov. 12, 2015

Related U.S. Application Data

(60) Provisional application No. 61/989,471, filed on May 6, 2014.

(51) Int. Cl.
| | | |
|---|---|---|
| *C11D 3/42* | (2006.01) | |
| *C09B 1/00* | (2006.01) | |
| *C09B 11/00* | (2006.01) | |
| *C09B 11/10* | (2006.01) | |
| *C09B 21/00* | (2006.01) | |
| *C11D 3/30* | (2006.01) | |
| *C11D 3/40* | (2006.01) | |
| *C09B 57/00* | (2006.01) | |
| *C09B 19/00* | (2006.01) | |
| *C09B 17/00* | (2006.01) | |
| *C09B 55/00* | (2006.01) | |
| *C09B 67/28* | (2006.01) | |
| *C09B 69/10* | (2006.01) | |
| *C11D 3/20* | (2006.01) | |
| *C11D 3/28* | (2006.01) | |
| *C11D 3/34* | (2006.01) | |

(52) U.S. Cl.
CPC .............. *C11D 3/42* (2013.01); *C09B 1/00* (2013.01); *C09B 11/10* (2013.01); *C09B 17/00* (2013.01); *C09B 19/00* (2013.01); *C09B 21/00* (2013.01); *C09B 55/009* (2013.01); *C09B 57/00* (2013.01); *C09B 67/0077* (2013.01); *C09B 69/103* (2013.01); *C11D 3/2096* (2013.01); *C11D 3/28* (2013.01); *C11D 3/30* (2013.01); *C11D 3/3481* (2013.01); *C11D 3/40* (2013.01)

(58) Field of Classification Search
CPC .. C11D 3/42; C09B 1/00; C09B 11/00; C09B 11/10; C09B 21/00
See application file for complete search history.

(56) References Cited

U.S. PATENT DOCUMENTS

| | | | |
|---|---|---|---|
| 3,926,830 A | 12/1975 | Horiguchi et al. | |
| 4,622,395 A | 11/1986 | Bellus | |
| 5,071,986 A | 12/1991 | Phaff | |
| 5,885,304 A | 3/1999 | Schneider | |
| 2013/0315992 A1* | 11/2013 | Clunas | C07D 279/20 424/464 |

FOREIGN PATENT DOCUMENTS

| | | | | |
|---|---|---|---|---|
| CN | 102639647 | | 8/2012 | |
| GB | 822846 | | 11/1959 | |
| JP | S5030878 | | 3/1975 | |
| JP | S5016364 | | 6/1975 | |
| JP | S5358506 | | 5/1978 | |
| JP | S63122760 | | 5/1988 | |
| WO | 9742825 | | 11/1997 | |
| WO | 0184937 | | 11/2001 | |
| WO | 2006041739 | | 4/2006 | |
| WO | WO 2006/055843 | * | 5/2006 | ............. C09B 69/10 |
| WO | WO 2006/055843 A2 | | 5/2006 | |
| WO | WO 2007/008389 | * | 1/2007 | ............. A01N 25/00 |
| WO | WO 2007/008389 A2 | | 1/2007 | |
| WO | WO 2008/100445 | * | 8/2008 | ............. C09B 69/00 |
| WO | WO 2008/100445 A2 | | 8/2008 | |
| WO | 2014092865 | | 6/2014 | |

OTHER PUBLICATIONS

Yagi et al., "Colorimetric sensing of metal ions by bis(spiropyran) podands: Towards naked-eye detection of alkaline earth metal ions", Dyes and Pigments 80 (2009) 98-105.
PCT/US2015/029210 Internal Search Report, International filing date May 5, 5015, 7 pages.
PCT/US2015/029210 Written Opinion of the International Searching Authority, International filing date May 5, 5015, 9 pages.

* cited by examiner

*Primary Examiner* — Brian P Mruk
(74) *Attorney, Agent, or Firm* — Robert M. Lanning

(57) ABSTRACT

A laundry care composition comprises a laundry care ingredient or adjunct and at least one compound that is capable of changing from a first color state (i.e., the initial color state in the composition) to a second color state that is perceptibly different from the first color state. A method for treating textile articles comprises the steps of: (a) providing a laundry care composition as described above; (b) adding the laundry care composition to a liquid medium; and (c) placing the textile articles in the liquid medium.

6 Claims, No Drawings

LAUNDRY CARE COMPOSITIONS

CROSS-REFERENCE TO RELATED APPLICATIONS

This application claims, pursuant to 35 U.S.C. § 119(e), priority to and the benefit of the filing date of U.S. Patent Application No. 61/989,471, which application was filed on May 6, 2014.

TECHNICAL FIELD OF THE INVENTION

This application describes laundry care compositions and their use in the laundering of textile articles. More specifically, the application describes laundry care compositions that are designed to enhance the apparent or visually perceived whiteness of or to impart a desired hue to textile articles washed or otherwise treated with the laundry care composition.

BACKGROUND

With repeated wear and laundering, the appearance of textile articles can begin to deteriorate. This deterioration can become very apparent on white textile articles, with the article begin to develop a yellow or dingy appearance. In an effort to reduce or at least slow this deterioration, some laundry care compositions have incorporated a bluing or hueing agent. These bluing or hueing agents are colorants that will impart a slight bluish hue to the textile articles. The resulting bluish hue helps to mask the yellowing of the textile article. Also, a bluish white is perceived by many to be whiter or "cleaner" than other shades of white.

One drawback to the use of bluing or hueing agents is that they typically are incorporated into the laundry care composition at levels that can render the composition a deep, dark blue. And while some consumers may prefer a laundry care composition exhibiting such a color, other consumers do not prefer these hues.

A need therefore exists for laundry care compositions that exhibit coloration that is pleasing to a wide variety of consumers and yet is capable of bluing or hueing textile articles washed or otherwise treated with the laundry care composition. The compositions described herein attempt to provide such benefits.

BRIEF SUMMARY OF THE INVENTION

In a first embodiment, the invention provides a laundry care composition comprising a laundry care ingredient or adjunct and at least one compound that is capable of changing from a first color state (i.e., the initial color state in the composition) to a second color state that is perceptibly different from the first color state.

In a specific embodiment, the invention provides a laundry care composition comprising a laundry care ingredient and at least one compound conforming to a structure selected from the group consisting of Formulae (I)-(XC) below

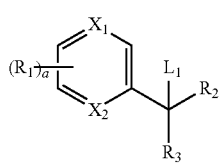

(I)

wherein $X_1$ and $X_2$ are selected from the group consisting of a carbon atom and a nitrogen atom; a is an integer from 0 to 5, provided a is an integer from 0 to 4 when one of $X_1$ and $X_2$ is a nitrogen atom and a is an integer from 0 to 3 when both $X_1$ and $X_2$ are nitrogen atoms; each $R_1$ is independently selected from the group consisting of halogens, a hydroxy group, a nitro group, alkyl groups, substituted alkyl groups, —S(O)$_2$OH, —S(O)$_2$O$^-$[M$^+$], —C(O)OR$_5$, —C(O)R$_5$, —C(O)NR$_5$R$_6$, —NC(O)OR$_5$, —NC(O)SR$_5$, —OR$_5$, —NR$_5$R$_6$, —S(O)$_2$R$_5$, —S(O)$_2$NR$_5$R$_6$, and —P(O)$_2$R$_5$; M is a cation; $R_5$ and $R_6$ are independently selected from the group consisting of hydrogen, alkyl groups, substituted alkyl groups, aryl groups, substituted aryl groups, and $R_a$; $R_2$ and $R_3$ are independently selected from the group consisting of aryl groups, substituted aryl groups, heteroaryl groups, and substituted heteroaryl groups, provided at least one of $R_2$ and $R_3$ is heteroaryl group or a substituted heteroaryl group when both $X_1$ and $X_2$ are carbon atoms; $L_1$ is selected from the group consisting of hydrogen, halogens, a hydroxy group, a cyano group, and —OR$_8$; $R_8$ is selected from the group consisting of alkyl groups and substituted alkyl groups;

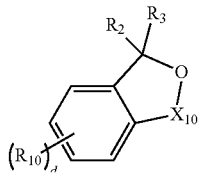

(X)

wherein $X_{10}$ is selected from the group consisting of —C(O)— and —S(O)$_2$; d is an integer from 0 to 4; each $R_{10}$ is independently selected from the group consisting of halogens, a nitro group, alkyl groups, substituted alkyl groups, aryl groups, substituted aryl groups, —S(O)$_2$OH, —S(O)$_2$O$^-$[M$^+$], —C(O)OR$_5$, —C(O)R$_5$, —C(O)NR$_5$R$_6$, —NC(O)OR$_5$, —NC(O)SR$_5$, —OR$_5$, —NR$_5$R$_6$, —S(O)$_2$R$_5$, —S(O)$_2$NR$_5$R$_6$, and —P(O)$_2$R$_5$; provided at least one of $R_2$ and $R_3$ is selected from the group consisting of heteroaryl groups and substituted heteroaryl groups;

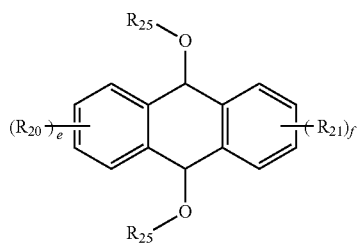

(XX)

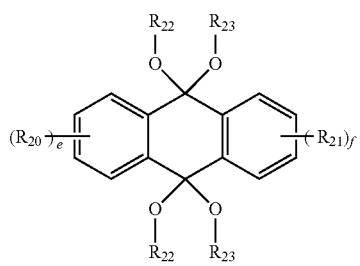

(XXV)

wherein e and f are independently integers from 0 to 4; each $R_{20}$ and $R_{21}$ is independently selected from the group consisting of halogens, a nitro group, alkyl groups, substituted alkyl groups, —NC(O)OR$_5$, —NC(O)SR$_5$, —OR$_5$, and —NR$_5$R$_6$; each $R_{25}$ is independently selected from the group consisting of saccharide residues (i.e., monosaccharide residues, disaccharide residues, oligosaccharide residues, and polysaccharide residues), —C(O)R$_5$, —C(O)OR$_5$, —C(O)NR$_5$R$_6$; and each $R_{22}$ and $R_{23}$ is independently selected from the group consisting of hydrogen, alkyl groups, and substituted alkyl groups;

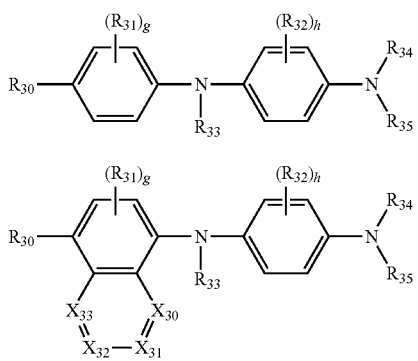

wherein $R_{30}$ is selected from the group consisting of —OR$_{36}$ and —NR$_{36}$R$_{37}$, each $R_{36}$ and $R_{37}$ is independently selected from the group consisting of hydrogen, alkyl groups, substituted alkyl groups, aryl groups, substituted aryl groups, acyl groups, —C(O)OR$_5$, —C(O)R$_5$, and —C(O)NR$_5$R$_6$; g and h are independently integers from 0 to 4; each $R_{31}$ and $R_{32}$ is independently selected from the group consisting of alkyl groups, substituted alkyl groups, aryl groups, substituted aryl groups, —S(O)$_2$OH, —S(O)$_2$O$^-$[M$^+$], —C(O)OR$_5$, —C(O)R$_5$, —C(O)NR$_5$R$_6$, —NC(O)OR$_5$, —NC(O)SR$_5$, —OR$_5$, —NR$_5$R$_6$, —S(O)$_2$R$_5$, —S(O)$_2$NR$_5$R$_6$, and —P(O)$_2$R$_5$; $R_{34}$ and $R_{35}$ are independently selected from the group consisting of hydrogen, alkyl groups, substituted alkyl groups, aryl groups, substituted aryl groups, and $R_a$; $R_{33}$ is selected from the group consisting of hydrogen, —S(O)$_2$R$_5$, —C(O)N(H)R$_5$; —C(O)OR$_5$; and —C(O)R$_5$; $X_{30}$, $X_{31}$, $X_{32}$, and $X_{33}$ are independently selected from the group consisting of a carbon atom and a nitrogen atom, provided no more than two of $X_{30}$, $X_{31}$, $X_{32}$, and $X_{33}$ are nitrogen atoms;

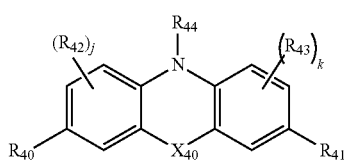

wherein $X_{40}$ is selected from the group consisting of an oxygen atom, a sulfur atom, and NR$_{45}$; $R_{45}$ is selected from the group consisting of alkyl groups, substituted alkyl groups, aryl groups, substituted aryl groups, —S(O)$_2$OH, —S(O)$_2$O$^-$[M$^+$], —C(O)OR$_5$, —C(O)R$_5$, and —C(O)NR$_5$R$_6$; $R_{40}$ and $R_{41}$ are independently selected from the group consisting of —OR$_5$ and —NR$_5$R$_6$; j and k are independently integers from 0 to 3; each $R_{42}$ and $R_{43}$ is independently selected from the group consisting of alkyl groups, substituted alkyl groups, aryl groups, substituted aryl groups, —S(O)$_2$R$_5$, —C(O)NR$_5$R$_6$, —NC(O)OR$_5$, —NC(O)SR$_5$, —C(O)OR$_5$, —C(O)R$_5$, —OR$_5$, —NR$_5$R$_6$; $R_{44}$ is selected from the group consisting of —C(O)R$_5$, —C(O)NR$_5$R$_6$, —C(O)OR$_5$, and —C(O)OR$_5$;

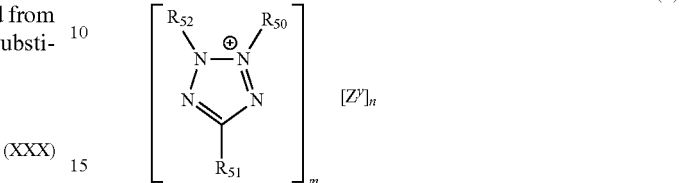

wherein $R_{50}$, $R_{51}$, and $R_{52}$ are independently selected from the group consisting of aryl groups, substituted aryl groups, heteroaryl groups, and substituted heteroaryl groups; Z is an anion; m and n are independently positive integers; y is the charge of the anion; the values of m, n, and y satisfy the following equation m=(−1)·y·n;

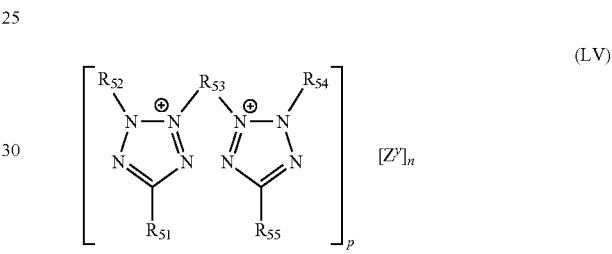

wherein $R_{54}$ and $R_{55}$ are independently selected from the group consisting of aryl groups, substituted aryl groups, heteroaryl groups, and substituted heteroaryl groups; $R_{53}$ is selected from the group consisting of arenediyl groups, substituted arenediyl groups, heteroarenediyl groups, and substituted heteroarenediyl groups; p is a positive integer; the values of p, n, and y satisfy the following equation 2m=(−1)·y·n;

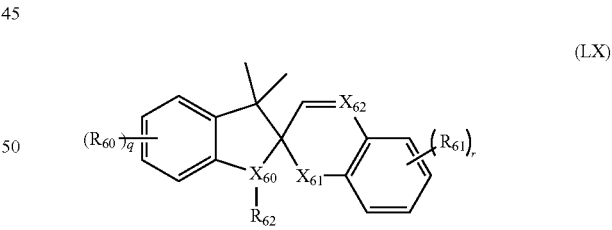

wherein $X_{60}$ is selected from the group consisting of a nitrogen atom and a sulfur atom; $X_{61}$ is selected from the group consisting of an oxygen atom and a sulfur atom; $X_{62}$ is selected from the group consisting of a carbon atom and a nitrogen atom; q and r are independently integers from 0 to 4; each $R_{60}$ and $R_{61}$ is independently selected from the group consisting of halogens, alkyl groups, substituted alkyl groups, aryl groups, substituted aryl groups, —OR$_5$, and —NR$_5$R$_6$; if q or r is 2 or greater, adjacent $R_{60}$ and $R_{61}$ groups can be combined to form an aryl group or a substituted aryl group; $R_{62}$ is selected from the group consisting of alkyl groups and substituted alkyl groups;

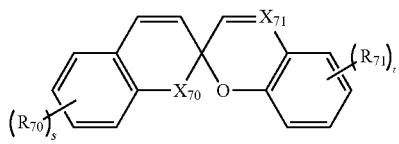
(LXX)

wherein $X_{70}$ is selected from the group consisting of an oxygen atom, a nitrogen atom, and a sulfur atom; $X_{71}$ is selected from the group consisting of a carbon atom and a nitrogen atom; s and t are independently integers from 0 to 4; each $R_{70}$ and $R_{71}$ are independently selected from the group consisting of halogens, alkyl groups, substituted alkyl groups, aryl groups, substituted aryl groups, —NC(O)OR$_5$, —NC(O)SR$_5$, —OR$_5$, and —NR$_5$R$_6$; if s or t is 2 or greater, adjacent $R_{70}$ and $R_{71}$ groups can be combined to form an aryl group or a substituted aryl group;

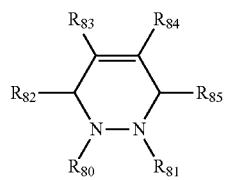
(LXXX)

wherein $R_{80}$ and $R_{81}$ are independently selected from the group consisting of alkenyl groups, substituted alkenyl groups, aryl groups, substituted aryl groups, heteroaryl groups, and substituted heteroaryl groups; $R_{82}$, $R_{83}$, $R_{84}$, and $R_{85}$ are independently selected from the group consisting of hydrogen, alkyl groups, substituted alkyl groups, aryl groups, substituted aryl groups, —C(O)OR$_5$, —C(O)R$_5$, —C(O)NR$_5$R$_6$, —NC(O)OR$_5$, —NC(O)SR$_5$, —OR$_5$, and —S(O)$_2$R$_5$; further, $R_{82}$ and $R_{85}$ can be combined to form a bridging alkanediyl group, a bridging oxygen atom, a bridging nitrogen atom, or a bridging sulfur atom;

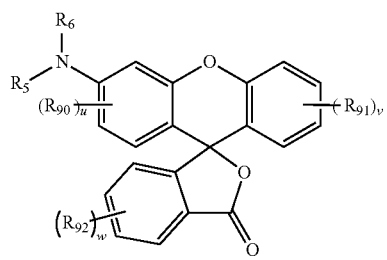
(XC)

wherein u is an integer from 0 to 3; v and w are independently integers from 0 to 4; $R_{90}$, $R_{91}$, and $R_{92}$ are independently selected from the group consisting of halogens, alkyl groups, substituted alkyl groups, aryl groups, substituted aryl groups, —OR$_5$, —NR$_5$R$_6$, —C(O)OR$_5$, —C(O)NR$_5$R$_6$, —NC(O)OR$_5$, —NC(O)SR$_5$, —S(O)$_2$R$_5$, and —S(O)$_2$NR$_5$R$_6$;
wherein $R_a$ is selected from the group consisting of —R$_x$—O—R$_y$—R$_z$ and —R$_y$—R$_z$; R$_x$ is selected from the group consisting of alkanediyl groups and arenediyl groups; R$_z$ is selected from the group consisting of hydrogen, alkyl groups, substituted alkyl groups, acyl groups, and R$_b$; R$_b$ is a monovalent group conforming to a structure selected from the group consisting of Formulae (I)-(XC); and R$_y$ is a divalent substituent selected from the group consisting of:

(i) divalent substituents comprising two or more divalent repeating units independently selected from repeating units conforming to the structure of Formula (C)

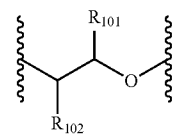
(C)

wherein $R_{101}$ and $R_{102}$ are independently selected from the group consisting of hydrogen, alkyl, hydroxyalkyl, aryl, alkoxyalkyl, and aryloxyalkyl;

(ii) divalent substituents conforming to the structure of Formula (CX)

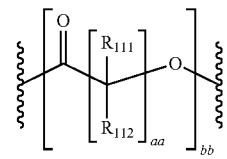
(CX)

wherein $R_{111}$ and $R_{112}$ are independently selected from the group consisting of hydrogen, hydroxyl, and C$_1$-C$_{10}$ alkyl, aa is an integer from 1 to 12, and bb is an integer greater than or equal to 1 (e.g., from 1 to 100);

(iii) divalent substituents conforming to the structure of Formula (CXX)

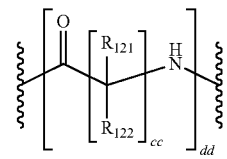
(CXX)

wherein $R_{121}$ and $R_{122}$ are independently selected from the group consisting of hydrogen, hydroxyl, and C$_1$-C$_{10}$ alkyl, cc is an integer from 1 to 12, and dd is an integer greater than or equal to 1 (e.g., from 1 to 100);

(iv) divalent substituents conforming to the structure of Formula (CXXX)

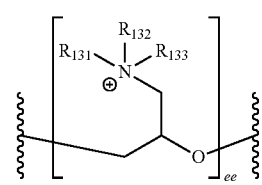
(CXXX)

wherein $R_{131}$, $R_{132}$, and $R_{133}$ are independently selected from alkyl and hydroxyalkyl, and ee is an integer greater than or equal to 1 (e.g., from 1 to 100);

(v) divalent substituents conforming to the structure of Formula (CXL)

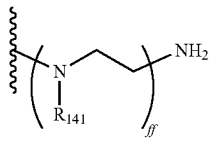
(CXL)

wherein each $R_{141}$ is independently selected from the group consisting of hydrogen and alkylamine groups, and ff is an integer greater than or equal to 1 (e.g., from 1 to 100);

(vi) divalent substituents conforming to the structure of Formula (CL)

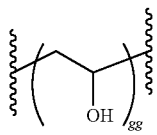
(CL)

wherein gg is an integer greater than or equal to 1 (e.g., from 1 to 100);

(vii) divalent substituents conforming to the structure of Formula (CLX)

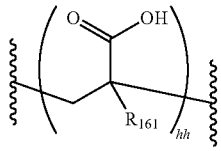
(CLX)

wherein each $R_{161}$ is independently selected from the group consisting of hydrogen and methyl, and hh is an integer greater than or equal to 1 (e.g., from 1 to 100);

(viii) divalent substituents conforming to the structure of Formula (CLXX)

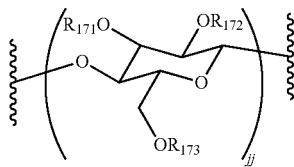
(CLXX)

wherein each $R_{171}$, $R_{172}$, and $R_{173}$ is independently selected from the group consisting of hydrogen and —$CH_2CO_2H$, and jj is an integer greater than or equal to 1 (e.g., from 1 to 100); and (ix) divalent substituents comprising two or more substituents selected from the group consisting of substituents conforming to a structure of Formula (C), (CX), (CXX), (CXXX), (CXL), (CL), (CLX), or (CLXX).

In a second embodiment, the invention provides a method for treating textile articles. The method comprises the steps of: (a) providing a laundry care composition as described above; (b) adding the laundry care composition to a liquid medium; and (c) placing the textile articles in the liquid medium. The method is preferably performed under conditions sufficient to convert the compound conforming to a structure selected from the group consisting of Formulae (I)-(XC) from the unconjugated state represented by the structure to a conjugated state.

DETAILED DESCRIPTION OF THE INVENTION

The following definitions are provided to define several of the terms used throughout this application.

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "substituted alkoxy groups" refers to univalent functional groups derived from substituted hydroxyalkanes by removal of a hydrogen atom from a hydroxy group. In this definition, the term "substituted hydroxyalkanes" refers to compounds having one or more hydroxy groups bonded to a substituted alkane, and the term "substituted alkane" is defined as it is above in the definition of substituted alkyl groups.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "substituted heteroaryl groups" refers to univalent functional groups derived from substituted heteroarenes by removal of a hydrogen atom from a ring atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., a hydroxy group) and (2) at least one methine group (—C═) of the hydrocarbon is replaced by a trivalent heteroatom and/or at least one vinylidene group (—CH═CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "cycloalkanediyl groups" refers to divalent functional groups derived from cycloalkanes by removal of two hydrogen atoms from the cycloalkane. These hydrogen atoms can be removed from the same carbon atom on the cycloalkane or from different carbon atoms.

As used herein, the term "substituted cycloalkanediyl groups" refers to divalent functional groups derived from substituted cycloalkanes by removal of two hydrogen atoms from the alkane. In this definition, the term "substituted cycloalkanes" has the same meaning as set forth above in the definition of substituted cycloalkyl groups.

As used herein, the term "arenediyl groups" refers to divalent functional groups derived from arenes (monocyclic and polycyclic aromatic hydrocarbons) by removal of two hydrogen atoms from ring carbon atoms.

As used herein, the term "substituted arenediyl groups" refers to divalent functional groups derived from substituted arenes by removal of two hydrogen atoms from ring carbon atoms. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heteroarenediyl groups" refers to divalent functional groups derived from heteroarenes by removal of two hydrogen atoms from ring atoms. In this definition, the term "heteroarenes" refers to compounds derived from monocyclic and polycyclic aromatic hydrocarbons in which at least one methine group (—C═) of the hydrocarbon is replaced by a trivalent heteroatom and/or at least one vinylidene group (—CH═CH—) of the hydrocarbon is replaced by a divalent heteroatom.

As used herein, the term "substituted heteroarenediyl groups" refers to divalent functional groups derived from substituted heteroarenes by removal of two hydrogen atoms from ring atoms. In this definition, the term "substituted heteroarenes" has the same meaning as set forth above in the definition of substituted heteroaryl groups.

As used herein, the term "acyl groups" refers to univalent functional groups derived from alkyl carboxylic acids by removal of a hydroxy group from a carboxylic acid group. In this definition, the term "alkyl carboxylic acids" refers to acyclic, unbranched and branched hydrocarbons having one or more carboxylic acidgroups.

As used herein, the term "substituted acyl groups" refers to univalent functional groups derived from substituted alkyl carboxylic acids by removal of a hydroxy group from a carboxylic acid group. In this definition, the term "substituted alkyl carboxylic acids" refers to compounds having one or more carboxylic acid groups bonded to a substituted alkane, and the term "substituted alkane" is defined as it is above in the definition of substituted alkyl groups.

As used herein, the term "laundry care composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products, such as dryer added sheets.

As used herein, the term "detergent composition" is a sub-set of laundry care composition and includes cleaning compositions including but not limited to products for laundering fabrics. Such compositions may be pre-treatment composition for use prior to a washing step or may be rinse added compositions, as well as cleaning auxiliaries, such as bleach additives and "stain-stick" or pre-treat types.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the term "solid" includes granular, powder, bar and tablet product forms.

As used herein, the term "fluid" includes liquid, gel, paste and gas product forms.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

In a first embodiment, the invention provides a laundry care composition comprising a laundry care ingredient or adjunct and at least one compound that is capable of changing from a first color state (i.e., the initial color state in the composition) to a second color state that is perceptibly different from the first color state. Thus, the compound can change from an uncolored state to a colored state. Alternatively, the compound can change from a first color to a second color, with the first color and second colors being perceptibly different from each other. In a preferred embodiment, the second color state of the compound exhibits a λmax in the wavelength range of about 480 to about 680 nm, more preferably about 540 to about 680 nm and most preferably about 520 to about 320 nm. In another preferred embodiment, the first color state of the compound is colorless (i.e., the compound does not exhibit a visually perceptible color) and the second color state of the compound exhibits a λmax in the wavelength range of about 480 to about 680 nm, more preferably about 540 to about 680 nm and most preferably about 520 to about 320 nm.

The compound can be any suitable compound capable of exhibiting the color change characteristics described above. Preferably, the compound conforms to a structure selected from the group consisting of Formulae (I), (X), (XX), (XXV), (XXX), (XXXV), (XL), (L), (LV), (LX), (LXX), (LXXX), and (XC) below.

The structure of Formula (I) is

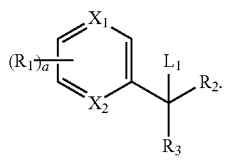

(I)

In this structure, $X_1$ and $X_2$ are selected from the group consisting of a carbon atom and a nitrogen atom. The variable a is an integer from 0 to 5, provided a is an integer from 0 to 4 when one of $X_1$ and $X_2$ is a nitrogen atom and a is an integer from 0 to 3 when both $X_1$ and $X_2$ are nitrogen atoms. Each $R_1$ is independently selected from the group consisting of halogens, a hydroxy group, a nitro group, alkyl groups, substituted alkyl groups, —S(O)$_2$OH, —S(O)$_2$O$^-$[M$^+$], —C(O)OR$_5$, —C(O)R$_5$, —C(O)NR$_5$R$_6$, —NC(O)OR$_5$, —NC(O)SR$_5$, —OR$_5$, —NR$_5$R$_6$, —S(O)$_2$R$_5$, —S(O)$_2$NR$_5$R$_6$, and —P(O)$_2$R$_5$. Each M is a cation. $R_5$ and $R_6$ are independently selected from the group consisting of hydrogen, alkyl groups, substituted alkyl groups, aryl groups, substituted aryl groups, and $R_a$. $R_2$ and $R_3$ are independently selected from the group consisting of aryl groups, substituted aryl groups, heteroaryl groups, and substituted heteroaryl groups, provided at least one of $R_2$ and $R_3$ preferably is a heteroaryl group or a substituted heteroaryl group when both $X_1$ and $X_2$ are carbon atoms. $L_1$ is selected from the group consisting of hydrogen, halogens, a hydroxy group, a cyano group, and —OR$_8$; and $R_8$ is selected from the group consisting of alkyl groups and substituted alkyl groups.

$R_2$ and $R_3$ can be any suitable aryl group, substituted aryl group, heteroaryl group, or substituted heteroaryl group. Suitable groups include, but are not limited to, aromatic groups conforming to a structure of Formula (IA)-(IJ) below

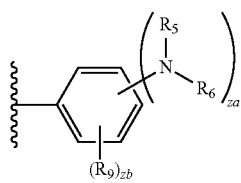

(IA)

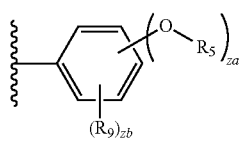

(IB)

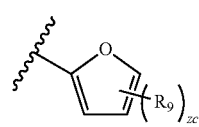

(IC)

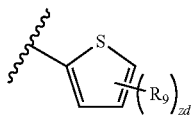

(ID)

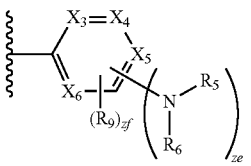

(IE)

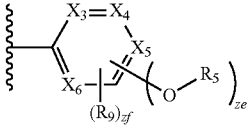

(IF)

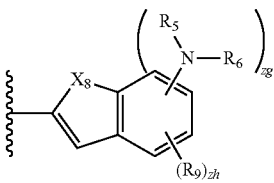

(IG)

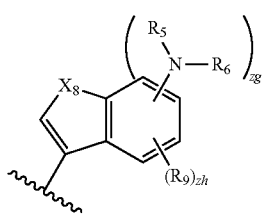

(IH)

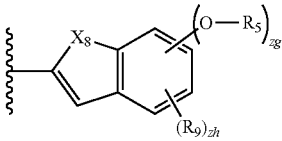

(II)

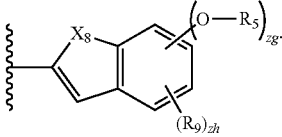

(IJ)

In the structures of Formulae (IA)-(IJ), $R_5$ and $R_6$ are the same as defined above, and $R_9$ is selected from the group consisting of alkyl groups, substituted alkyl groups, aryl groups, substituted aryl groups, heteroaryl groups, substituted heteroaryl groups, a cyano group, halogens, —S(O)$_2$OH, —S(O)$_2$NR$_5$R$_6$, —C(O)OH, and —C(O)OR$_5$. Further, two or more adjacent $R_9$ groups can be combined to form a fused ring structure. $X_3$, $X_4$, $X_5$, and $X_6$ are selected from the group consisting of a carbon atom and a nitrogen atom, provided (1) at least one of $X_3$, $X_4$, $X_5$, and $X_6$ is a nitrogen atom, (2) when $X_4$ is a nitrogen atom, then $X_3$ and $X_5$ are both carbon atoms and (3) when $X_3$ is a nitrogen atom, then $X_4$ is a carbon atom. The variables za and zb are independently selected from the group consisting of integers from 0 to 5, with the sum of za and zb being an integer from 0 to 5. The variables zc and zd are independently selected from the group consisting of integers from 0 to 3. The variables ze and zf are independently selected from the group consisting of integers from 0 to 4, with the sum of ze and zf being less than or equal to 5-N, where N is equal to the number of nitrogen atoms in the aromatic ring. The variables zg and zh are independently selected from the group consisting of integers from 0 to 4, with the sum of zg and zh being an integer from 0 to 4.

The structure of Formula (X) is

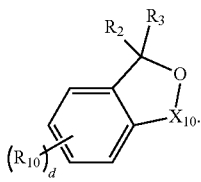

In this structure, $X_{10}$ is selected from the group consisting of —C(O)— and —S(O)$_2$. The variable d is an integer from 0 to 4. Each $R_{10}$ is independently selected from the group consisting of halogens, a nitro group, alkyl groups, substituted alkyl groups, aryl groups, substituted aryl groups, —S(O)$_2$OH, —S(O)$_2$O$^-$[M$^+$], —C(O)OR$_5$, —C(O)R$_5$, —C(O)NR$_5$R$_6$, —NC(O)OR$_5$, —NC(O)SR$_5$, —OR$_5$, —NR$_5$R$_6$, —S(O)$_2$R$_5$, —S(O)$_2$NR$_5$R$_6$, and —P(O)$_2$R$_5$. Preferably, at least one of $R_2$ and $R_3$ is selected from the group consisting of heteroaryl groups and substituted heteroaryl groups. $R_5$ and $R_6$ are as defined above in the structure of Formula (I).

The structure of Formula (XX) is

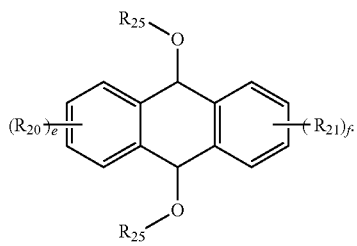

The structure of Formula (XXV) is

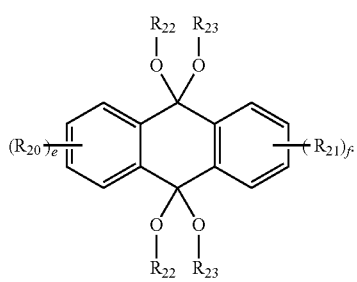

In these structures, the variables e and f are independently integers from 0 to 4. Each $R_{20}$ and $R_{21}$ is independently selected from the group consisting of halogens, a nitro group, alkyl groups, substituted alkyl groups, —NC(O)OR$_5$, —NC(O)SR$_5$, —OR$_5$, and —NR$_5$R$_6$. Each $R_{25}$ is independently selected from the group consisting of saccharide residues (i.e., monosaccharide residues, disaccharide residues, oligosaccharide residues, and polysaccharide residues), —C(O)R$_5$, —C(O)OR$_5$, —C(O)NR$_5$R$_6$. Each $R_{22}$ and $R_{23}$ is independently selected from the group consisting of hydrogen, alkyl groups, and substituted alkyl groups. $R_5$ and $R_6$ are as defined above in the structure of Formula (I).

The structure of Formula (XXX) is

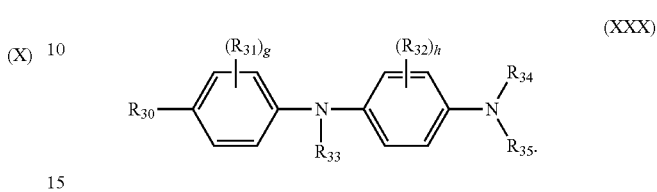

The structure of Formula (XXXV) is

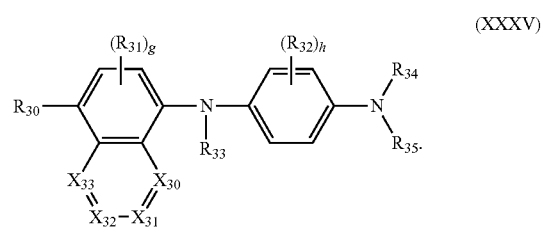

In these structures, $R_{30}$ is selected from the group consisting of —OR$_{36}$ and —NR$_{36}$R$_{37}$. Each $R_{36}$ and $R_{37}$ is independently selected from the group consisting of hydrogen, alkyl groups, substituted alkyl groups, aryl groups, substituted aryl groups, acyl groups, —C(O)OR$_5$, —C(O)R$_5$, and —C(O)NR$_5$R$_6$. The variables g and h are independently integers from 0 to 4. Each $R_{31}$ and $R_{32}$ is independently selected from the group consisting of alkyl groups, substituted alkyl groups, aryl groups, substituted aryl groups, —S(O)$_2$OH, —S(O)$_2$O$^-$[M$^+$], —C(O)OR$_5$, —C(O)R$_5$, —C(O)NR$_5$R$_6$, —NC(O)OR$_5$, —NC(O)SR$_5$, —OR$_5$, —NR$_5$R$_6$, —S(O)$_2$R$_5$, —S(O)$_2$NR$_5$R$_6$, and —P(O)$_2$R$_5$. $R_{34}$ and $R_{35}$ are independently selected from the group consisting of hydrogen, alkyl groups, substituted alkyl groups, aryl groups, substituted aryl groups, and $R_a$. $R_{33}$ is selected from the group consisting of hydrogen, —S(O)$_2$R$_5$, —C(O)N(H)R$_5$, —C(O)OR$_5$; and —C(O)R$_5$. $X_{30}$, $X_{31}$, $X_{32}$, and $X_{33}$ are independently selected from the group consisting of a carbon atom and a nitrogen atom, provided no more than two of $X_{30}$, $X_{31}$, $X_{32}$, and $X_{33}$ are nitrogen atoms. $R_5$ and $R_6$ are as defined above in the structure of Formula (I).

The structure of Formula (XL) is

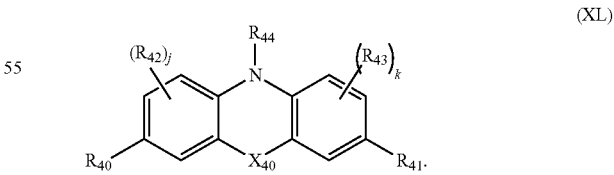

In this structure, $X_{40}$ is selected from the group consisting of an oxygen atom, a sulfur atom, and NR$_{45}$. $R_{45}$ is selected from the group consisting of alkyl groups, substituted alkyl groups, aryl groups, substituted aryl groups, —S(O)$_2$OH, —S(O)$_2$O$^-$[M$^+$], —C(O)OR$_5$, —C(O)R$_5$, and —C(O)NR$_5$R$_6$. $R_{40}$ and $R_{41}$ are independently selected from the group consisting of —OR$_5$ and —NR$_5$R$_6$. The variables j and k are independently integers from 0 to 3. Each $R_{42}$ and $R_{43}$ is independently selected from the group consisting of alkyl groups, substituted alkyl groups, aryl groups, substituted aryl groups, —S(O)$_2$R$_5$, —C(O)NR$_5$R$_6$, —NC(O)OR$_5$, —NC(O)SR$_5$, —C(O)OR$_5$, —C(O)R$_5$, —OR$_5$, —NR$_5$R$_6$; $R_{44}$ is selected from the group consisting of —C(O)R$_5$, —C(O)NR$_5$R$_6$, —C(O)OR$_5$, and —C(O)OR$_5$. $R_5$ and $R_6$ are as defined above in the structure of Formula (I).

In a preferred embodiment, $R_{44}$ is selected from the group consisting of

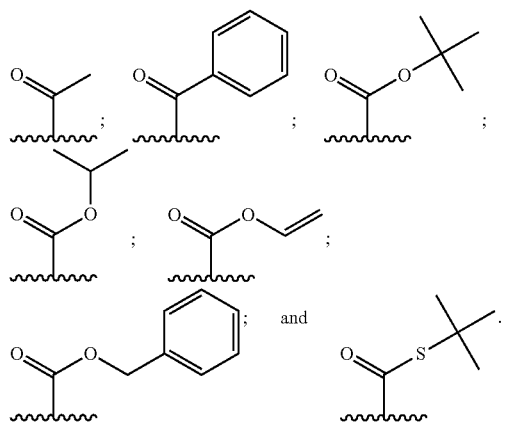

The structure of Formula (L) is

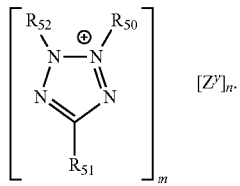

In this structure, $R_{50}$, $R_{51}$, and $R_{52}$ are independently selected from the group consisting of aryl groups, substituted aryl groups, heteroaryl groups, and substituted heteroaryl groups. Z is an anion. The variables m and n are independently positive integers. The variable y is the charge of the anion; and the values of m, n, and y satisfy the following equation $m = (-1) \cdot y \cdot n$.

The structure of Formula (LV) is

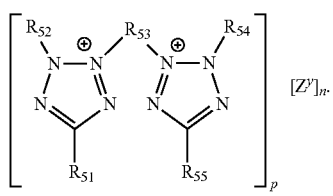

In this structure, $R_{54}$ and $R_{55}$ are independently selected from the group consisting of aryl groups, substituted aryl groups, heteroaryl groups, and substituted heteroaryl groups. $R_{53}$ is selected from the group consisting of arenediyl groups, substituted arenediyl groups, heteroarenediyl groups, and substituted heteroarenediyl groups. The variable p is a positive integer; and the values of p, n, and y satisfy the following equation $2m = (-1) \cdot y \cdot n$. $R_{51}$ and $R_{52}$ are as defined above in the structure of Formula (L).

The aromatic groups $R_{50}$, $R_{51}$, $R_{52}$, $R_{54}$, and $R_{55}$ of Formula (L) and (LV) can be any suitable aromatic groups. Suitable aromatic groups include, but are not limited to, groups conforming to the structures of Formulae (IA)-(IJ) described above. Suitable divalent aromatic groups for $R_{53}$ include, but are not limited to, divalent analogues of the structures of Formulae (IA)-(IJ).

The structure of Formula (LX) is

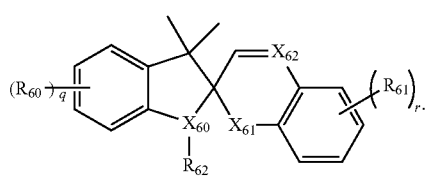

In this structure, $X_{60}$ is selected from the group consisting of a nitrogen atom and a sulfur atom. $X_{61}$ is selected from the group consisting of an oxygen atom and a sulfur atom. $X_{62}$ is selected from the group consisting of a carbon atom and a nitrogen atom. The variables q and r are independently integers from 0 to 4. Each $R_{60}$ and $R_{61}$ is independently selected from the group consisting of halogens, alkyl groups, substituted alkyl groups, aryl groups, substituted aryl groups, —NC(O)OR$_5$, —NC(O)SR$_5$, —OR$_5$, and —NR$_5$R$_6$. Further, if q or r is 2 or greater, adjacent $R_{60}$ and $R_{61}$ groups can be combined to form an aryl group or a substituted aryl group. $R_{62}$ is selected from the group consisting of alkyl groups and substituted alkyl groups. $R_5$ and $R_6$ are as defined above in the structure of Formula (I).

The structure of Formula (LXX) is

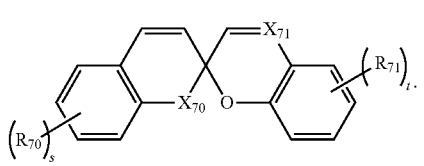

In this structure, $X_{70}$ is selected from the group consisting of an oxygen atom, a nitrogen atom, and a sulfur atom. $X_{71}$ is selected from the group consisting of a carbon atom and a nitrogen atom. The variables s and t are independently integers from 0 to 4. Each $R_{70}$ and $R_{71}$ are independently selected from the group consisting of halogens, alkyl groups, substituted alkyl groups, aryl groups, substituted aryl groups, —NC(O)OR$_5$, —NC(O)SR$_5$, —OR$_5$, and —NR$_5$R$_6$. Further, if s or t is 2 or greater, adjacent $R_{70}$ and $R_{71}$ groups can be combined to form an aryl group or a substituted aryl group. $R_5$ and $R_6$ are as defined above in the structure of Formula (I).

The structure of Formula (LXXX) is

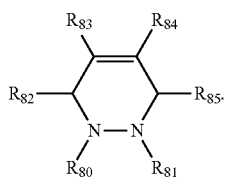

(LXXX)

In this structure, $R_{80}$ and $R_{81}$ are independently selected from the group consisting of alkenyl groups, substituted alkenyl groups, aryl groups, substituted aryl groups, heteroaryl groups, and substituted heteroaryl groups. $R_{82}$, $R_{83}$, $R_{84}$, and $R_{85}$ are independently selected from the group consisting of hydrogen, alkyl groups, substituted alkyl groups, aryl groups, substituted aryl groups, —C(O)OR$_5$, —C(O)R$_6$, —C(O)NR$_5$R$_6$, —NC(O)OR$_5$, —NC(O)SR$_5$, —OR$_5$, and —S(O)$_2$R$_5$. Further, $R_{82}$ and $R_{85}$ can be combined to form a bridging alkanediyl group, a bridging oxygen atom, a bridging nitrogen atom, or a bridging sulfur atom. $R_5$ and $R_6$ are as defined above in the structure of Formula (I).

The aromatic groups $R_{80}$ and $R_{81}$ can be any suitable aromatic groups. Suitable aromatic groups include, but are not limited to, groups conforming to the structures of Formulae (IA)-(IJ) described above.

The structure of Formula (XC) is

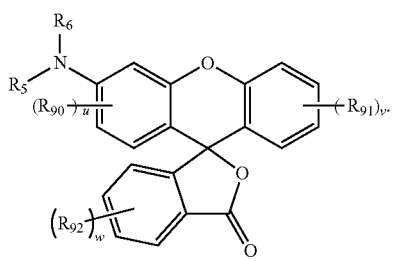

(XC)

In this structure, the variable u is an integer from 0 to 3. The variables v and w are independently integers from 0 to 4. $R_{90}$, $R_{91}$, and $R_{92}$ are independently selected from the group consisting of halogens, alkyl groups, substituted alkyl groups, aryl groups, substituted aryl groups, —OR$_5$, —NR$_5$R$_6$, —C(O)OR$_5$, —C(O)NR$_5$R$_6$, —NC(O)OR$_5$, —NC(O)SR$_5$, —S(O)$_2$R$_5$, and —S(O)$_2$NR$_5$R$_6$. $R_5$ and $R_6$ are as defined above in the structure of Formula (I).

In the structures of Formulae (I), (X), (XX), (XXV), (XXX), (XXXV), (XL), (L), (LV), (LX), (LXX), (LXXX), and (XC), $R_a$ is selected from the group consisting of —R$_x$—O—R$_y$—R$_z$ and —R$_y$—R$_z$. $R_x$ is selected from the group consisting of alkanediyl groups and arenediyl groups. $R_z$ is selected from the group consisting of hydrogen, alkyl groups, substituted alkyl groups, acyl groups, and R$_b$. R$_b$ is a monovalent group corresponding to the chromogenic moiety of a structure selected from the group consisting of Formulae (I)-(XC), which means that the —R$_x$—O—R$_y$— or —R$_y$— moiety serves a bridge or linker between two chromogenic moieties. $R_y$ is a divalent substituent selected from the group consisting of:

(i) divalent substituents comprising two or more divalent repeating units independently selected from repeating units conforming to the structure of Formula (C)

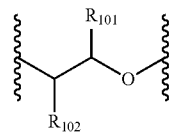

(C)

wherein $R_{101}$ and $R_{102}$ are independently selected from the group consisting of hydrogen, alkyl, hydroxyalkyl, aryl, alkoxyalkyl, and aryloxyalkyl;

(ii) divalent substituents conforming to the structure of Formula (CX)

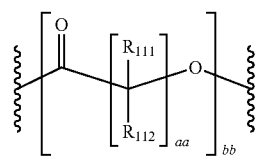

(CX)

wherein $R_{111}$ and $R_{112}$ are independently selected from the group consisting of hydrogen, hydroxyl, and $C_1$-$C_{10}$ alkyl, aa is an integer from 1 to 12, and bb is an integer greater than or equal to 1 (e.g., from 1 to 100);

(iii) divalent substituents conforming to the structure of Formula (CXX)

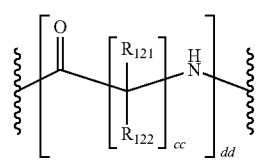

(CXX)

wherein $R_{121}$ and $R_{122}$ are independently selected from the group consisting of hydrogen, hydroxyl, and $C_1$-$C_{10}$ alkyl, cc is an integer from 1 to 12, and dd is an integer greater than or equal to 1 (e.g., from 1 to 100);

(iv) divalent substituents conforming to the structure of Formula (CXXX)

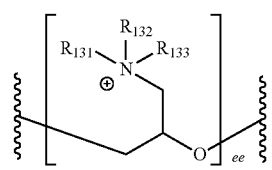

(CXXX)

wherein $R_{131}$, $R_{132}$, and $R_{133}$ are independently selected from alkyl and hydroxyalkyl, and ee is an integer greater than or equal to 1 (e.g., from 1 to 100);

(v) divalent substituents conforming to the structure of Formula (CXL)

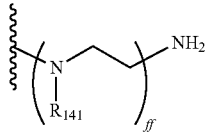 (CXL)

wherein each $R_{141}$ is independently selected from the group consisting of hydrogen and alkylamine groups, and ff is an integer greater than or equal to 1 (e.g., from 1 to 100);

(vi) divalent substituents conforming to the structure of Formula (CL)

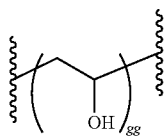 (CL)

wherein gg is an integer greater than or equal to 1 (e.g., from 1 to 100);

(vii) divalent substituents conforming to the structure of Formula (CLX)

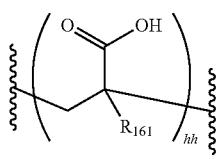 (CLX)

wherein each $R_{161}$ is independently selected from the group consisting of hydrogen and methyl, and hh is an integer greater than or equal to 1 (e.g., from 1 to 100);

(viii) divalent substituents conforming to the structure of Formula (CLXX)

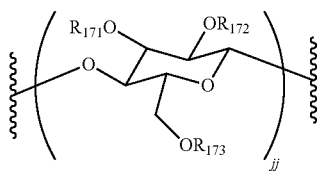 (CLXX)

wherein each $R_{171}$, $R_{172}$, and $R_{173}$ is independently selected from the group consisting of hydrogen and —$CH_2CO_2H$, and jj is an integer greater than or equal to 1 (e.g., from 1 to 100); and (ix) divalent substituents comprising two or more substituents selected from the group consisting of substituents conforming to a structure of Formula (C), (CX), (CXX), (CXXX), (CXL), (CL), (CLX), or (CLXX).

In a series of preferred embodiments, $R^y$ is a divalent substituent conforming to a structure selected from the group consisting of Formulae (CA), (CB), and (CC)

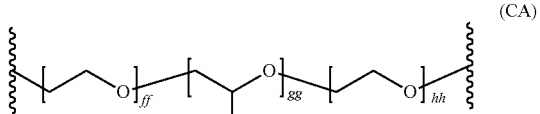 (CA)

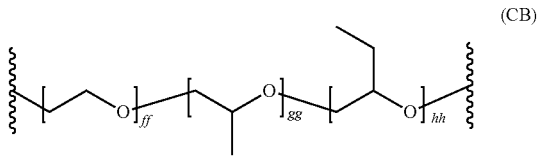 (CB)

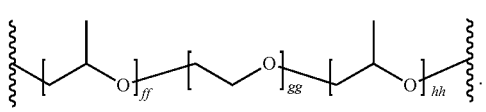 (CC)

In the structures of Formulae (CA), (CB), and (CC), ff, gg, and hh are selected from the group consisting of zero and positive integers (e.g., integers from 0 to about 100); and the sum of s, t, and v is 2 or more (e.g., 2 to about 300, 3 to about 300, 2 to about 200, 3 to about 200, 2 to about 100, 3 to about 100, 2 to about 50, 3 to about 50, about 3 to about 30, about 3 to about 25, or about 3 to about 20).

In the structures of Formulae (CA), (CB), and (CC), the divalent substituent $R^y$ is depicted as comprising a series of repeating units arranged in a block configuration. While such an arrangement of the repeating units is possible and potentially preferred, the repeating units comprising the divalent substituent $R^y$ can also be arranged in a random configuration or in any suitable combination of a block configuration and a random configuration. For example, $R^y$ can be a divalent substituent comprising a series of two or more different repeating units conforming to the structure of Formula (CA) arranged in a random configuration or a divalent substituent comprising a series of two more different repeating units conforming to the structure of Formula (CA) and one or more repeating units conforming to the structure of Formula (CB) all arranged in a random configuration. Also, $R^y$ can be a divalent substituent comprising a series of two or more different repeating units conforming to the structure of Formula (CA) arranged in a random configuration followed by a block of repeating units conforming to the structure of Formula (CB).

As can be seen from the structures of Formulae (I), (X), (XX), (XXV), (XXX), (XXXV), (XL), (L), (LV), (LX), (LXX), (LXXX), and (XC), each compound possesses a structure in which a conjugated system (i.e., a system of conjugated p-orbitals) is interrupted by the presence of an additional substituent. For example, in the structure of Formula (I), the L group interrupts a conjugated system that would otherwise be formed by the aryl/heteroaryl groups surrounding the central carbon atom. This interruption of the conjugated system limits the compound's absorption of electromagnetic radiation in the visible spectrum and causes the compound to exhibit a first color state. Indeed, if the conjugation is very limited, the compound may not exhibit any perceptible absorption in the visible spectrum, meaning that the compound would be colorless. However, once the substituent interrupting the conjugation is removed, the compound possesses a conjugated system. And the compound will then exhibit a second color state due to the presence of this conjugated system.

The structures below depict the conjugated equivalents to the compounds of Formulae (I), (X), (XX), (XXV), (XXX), (XXXV), (XL), (L), (LV), (LX), (LXX), (LXXX), and (XC). The conjugated equivalent bears a similar label to the compounds above but is additionally designated with a prime (') symbol.

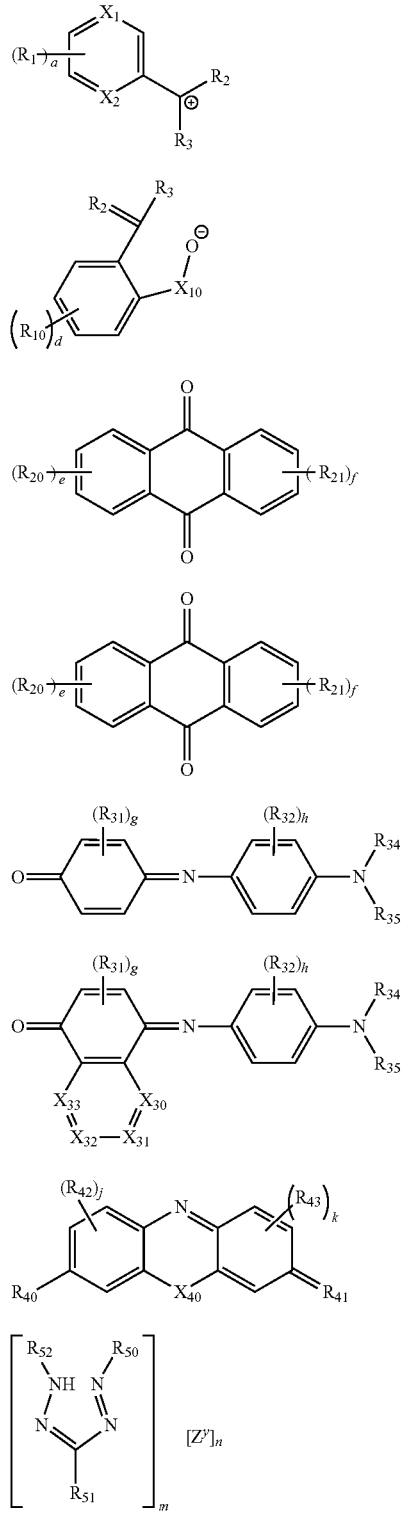

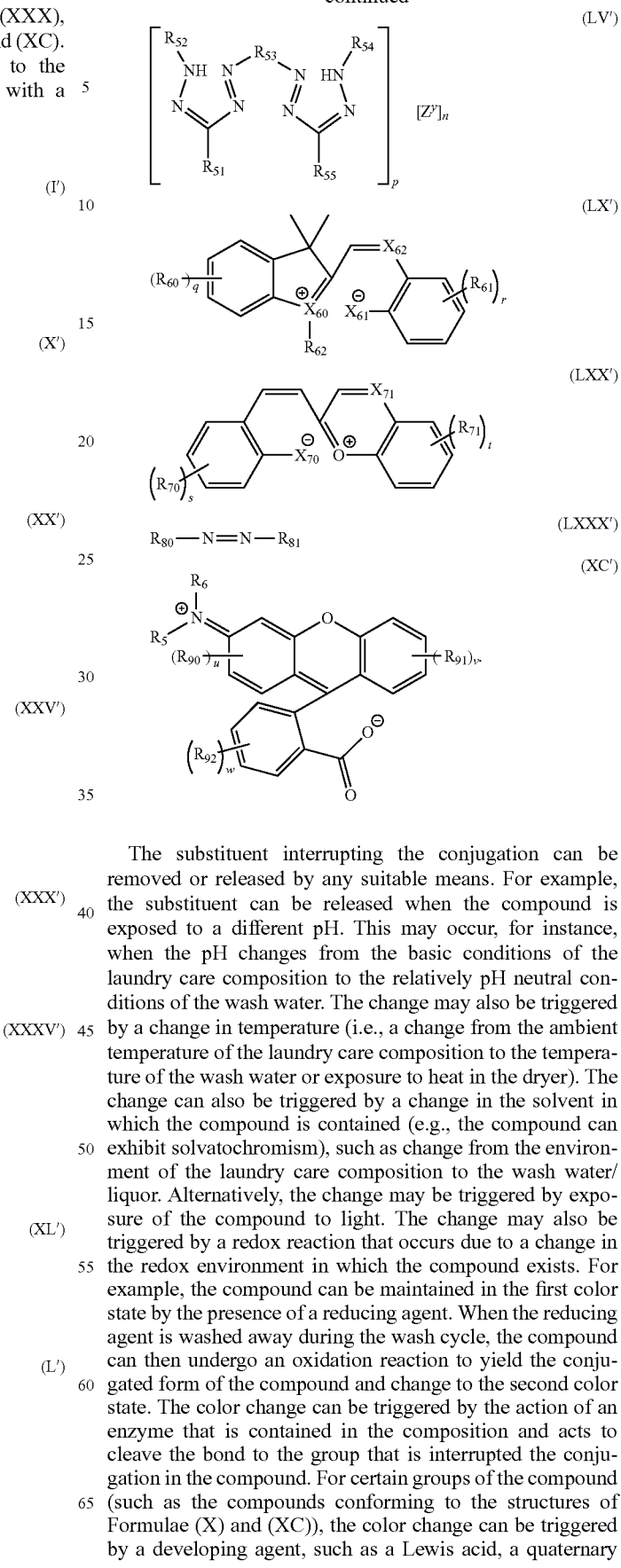

The substituent interrupting the conjugation can be removed or released by any suitable means. For example, the substituent can be released when the compound is exposed to a different pH. This may occur, for instance, when the pH changes from the basic conditions of the laundry care composition to the relatively pH neutral conditions of the wash water. The change may also be triggered by a change in temperature (i.e., a change from the ambient temperature of the laundry care composition to the temperature of the wash water or exposure to heat in the dryer). The change can also be triggered by a change in the solvent in which the compound is contained (e.g., the compound can exhibit solvatochromism), such as change from the environment of the laundry care composition to the wash water/liquor. Alternatively, the change may be triggered by exposure of the compound to light. The change may also be triggered by a redox reaction that occurs due to a change in the redox environment in which the compound exists. For example, the compound can be maintained in the first color state by the presence of a reducing agent. When the reducing agent is washed away during the wash cycle, the compound can then undergo an oxidation reaction to yield the conjugated form of the compound and change to the second color state. The color change can be triggered by the action of an enzyme that is contained in the composition and acts to cleave the bond to the group that is interrupted the conjugation in the compound. For certain groups of the compound (such as the compounds conforming to the structures of Formulae (X) and (XC)), the color change can be triggered by a developing agent, such as a Lewis acid, a quaternary salt, or a Brønsted acid. The compound or the agent that triggers the color change (e.g., developing agent or enzyme) can also be encapsulated in order to isolate the two when the composition is being stored. In such an embodiment, the capsule containing the compound or triggering agent would be designed to break and release its contents at the appropriate point in the use of the composition. The change may also be triggered when the compound chelates charged ions (e.g., $Mg^{2+}$ or $Ca^{2+}$) present in the wash water. Depending on the particular compound that is used, each of the mechanisms described above can alone trigger the change, or two or more mechanisms can jointly trigger the change. For example, the change to the conjugated form can be triggered by the changes in both pH and temperature that occur when the laundry care composition is added to the wash water.

The compound can be present in the laundry care composition in any suitable amount. For example, the compound conforming to a structure selected from the group consisting of Formulae (I)-(XC) can be present in the laundry care composition in an amount of about 0.001 wt. % or more. The compound typically is present in the laundry care composition in an amount of about 20 wt. % or less. Thus, in a preferred embodiment, the compound conforming to a structure selected from the group consisting of Formulae (I)-(XC) is present in the laundry care composition in an amount of about 0.001 wt. % to about 20 wt. %.

Laundry Care Adjunct Materials.

Suitable adjuncts may be, for example to assist or enhance cleaning performance, for treatment of the substrate to be cleaned, for example by softening or freshening, or to modify the aesthetics of the composition as is the case with perfumes, colorants, non-fabric-shading dyes or the like. Suitable adjunct materials include, but are not limited to, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, fabric softeners, carriers, hydrotropes, processing aids, solvents, additional dyes and/or pigments, some of which are discussed in more detail below. In addition to the disclosure below, suitable examples of such other adjuncts and levels of use are found in U.S. Pat. Nos. 5,576,282, 6,306,812 B1 and 6,326,348 B1 that are incorporated by reference.

Additional Fabric Hueing Agents. Although it is not preferred to incorporate additional fabric shading dyes, in addition to the compound conforming to a structure of Formula (I)-(XC), the composition may comprise one or more additional fabric hueing agents. Suitable fabric hueing agents include dyes, dye-clay conjugates, and pigments. Suitable dyes include those that deposit more onto cotton textiles compared to deposition onto synthetic textiles such as polyester and/or nylon. Further suitable dyes include those that deposit more onto synthetic fibres such as polyester and/or nylon compared to cotton. Suitable dyes include small molecule dyes and polymeric dyes. Suitable small molecule dyes include small molecule dyes selected from the group consisting of dyes falling into the Color Index (C.I.) classifications of Direct Blue, Direct Red, Direct Violet, Acid Blue, Acid Red, Acid Violet, Basic Blue, Basic Violet and Basic Red, or mixtures thereof. Examples of small molecule dyes include those selected from the group consisting of Color Index (Society of Dyers and Colourists, Bradford, UK) numbers Direct Violet 9, Direct Violet 35, Direct Violet 48, Direct Violet 51, Direct Violet 66, Direct Violet 99, Direct Blue 1, Direct Blue 71, Direct Blue 80, Direct Blue 279, Acid Red 17, Acid Red 73, Acid Red 88, Acid Red 150, Acid Violet 15, Acid Violet 17, Acid Violet 24, Acid Violet 43, Acid Red 52, Acid Violet 49, Acid Violet 50, Acid Blue 15, Acid Blue 17, Acid Blue 25, Acid Blue 29, Acid Blue 40, Acid Blue 45, Acid Blue 75, Acid Blue 80, Acid Blue 83, Acid Blue 90 and Acid Blue 113, Acid Black 1, Basic Violet 1, Basic Violet 3, Basic Violet 4, Basic Violet 10, Basic Violet 35, Basic Blue 3, Basic Blue 16, Basic Blue 22, Basic Blue 47, Basic Blue 66, Basic Blue 75, Basic Blue 159, small molecule dyes selected from the group consisting of Color Index (Society of Dyers and Colourists, Bradford, UK) numbers Acid Violet 17, Acid Violet 43, Acid Red 52, Acid Red 73, Acid Red 88, Acid Red 150, Acid Blue 25, Acid Blue 29, Acid Blue 45, Acid Blue 113, Acid Black 1, Direct Blue 1, Direct Blue 71. Direct Violet small molecule dyes may be preferred. Dyes selected from the group consisting Acid Violet 17, Direct Blue 71, Direct Violet 51, Direct Blue 1, Acid Red 88, Acid Red 150, Acid Blue 29, Acid Blue 113 and mixtures thereof may be preferred.

Suitable polymeric dyes include polymeric dyes selected from the group consisting of polymers containing covalently bound chromogens (dye-polymer conjugates) and polymers with chromogens co-polymerized into the backbone of the polymer and mixtures thereof, and polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® (Milliken, Spartanburg, S.C., USA) Violet CT, carboxymethyl cellulose (CMC) conjugated with a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof. Preferred additional hueing dyes include the whitening agents found in WO 08/87497 A1. These whitening agents may be characterized by the following structure (M):

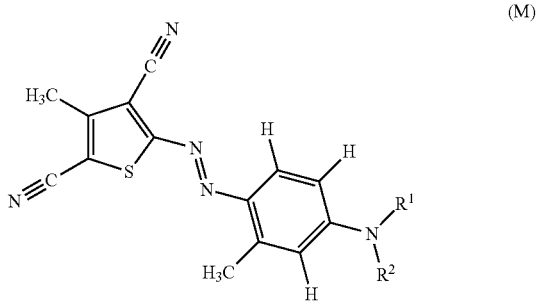

(M)

wherein $R^1$ and $R^2$ can independently be selected from:
a) $[(CH_2CR'HO)_x(CH_2CR''HO)_yH]$, wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein $x+y \leq 5$; wherein $y \geq 1$; and wherein $z=0$ to 5;

b) $R^1$=alkyl, aryl or aryl alkyl and $R^2$=[(CH$_2$CR'HO)$_x$(CH$_2$CR"HO)$_y$H] wherein R' is selected from the group consisting of H, CH$_3$, CH$_2$O(CH$_2$CH$_2$O)$_z$H, and mixtures thereof; wherein R" is selected from the group consisting of H, CH$_2$O(CH$_2$CH$_2$O)$_z$H, and mixtures thereof; wherein x+y≤10; wherein y≥1; and wherein z=0 to 5;

c) $R^1$=[CH$_2$CH(OR$^3$)CH$_2$OR$_4$] and $R^2$=[CH$_2$CH(OR$_3$) CH$_2$O R$^4$]

wherein $R^3$ is selected from the group consisting of H, (CH$_2$CH$_2$O)$_z$H, and mixtures thereof; and wherein z=0 to 10;

wherein $R^4$ is selected from the group consisting of (C$_1$-C$_{16}$)alkyl, aryl groups, and mixtures thereof; and d) wherein $R^1$ and $R^2$ can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

A preferred additional fabric hueing agent which may be incorporated into the compositions of the invention may be characterized by the following structure (Ml):

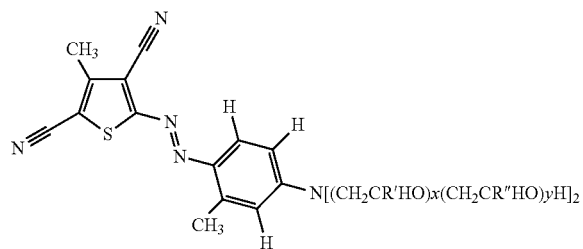

(MI)

wherein R' is selected from the group consisting of H, CH$_3$, CH$_2$O(CH$_2$CH$_2$O)$_z$H, and mixtures thereof; wherein R" is selected from the group consisting of H, CH$_2$O(CH$_2$CH$_2$O)$_z$H, and mixtures thereof; wherein x+y≤5; wherein y≥1; and wherein z=0 to 5.

A further preferred additional hueing dye may be characterized by the following structure (MII):

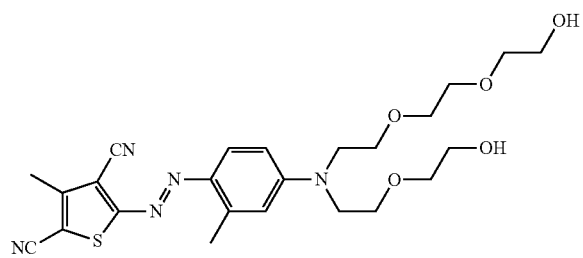

(MII)

This dye is typically a mixture of compounds having an average of 3-10 EO groups, preferably 5 EO groups per molecule.

Further additional shading dyes are those described in USPN 2008 34511 A1 (Unilever). A preferred agent is "Solvent Violet 13".

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C$_1$-C$_3$-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof. Particularly preferred are Pigment Blues 15 to 20, especially Pigment Blue 15 and/or 16. Other suitable pigments include those selected from the group consisting of Ultramarine Blue (C.I. Pigment Blue 29), Ultramarine Violet (C.I. Pigment Violet 15) and mixtures thereof. Suitable hueing agents are described in more detail in U.S. Pat. No. 7,208,459 B2, WO 2012/054835, WO 2009/069077, WO 2012/166768.

Encapsulates.

The composition may comprise an encapsulate. In one aspect, an encapsulate comprising a core, a shell having an inner and outer surface, said shell encapsulating said core. The core may comprise any laundry care adjunct, though typically the core may comprise material selected from the group consisting of perfumes; brighteners; dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinylalcohols, optionally containing other co-monomers; polystyrenes; polyisoprenes; polycarbonates; polyesters; polyacrylates; aminoplasts, in one aspect said aminoplast may comprise a polyurea, polyurethane, and/or polyureaurethane, in one aspect said polyurea may comprise polyoxymethyleneurea and/or melamine formaldehyde; polyolefins; polysaccharides, in one aspect said polysaccharide may comprise alginate and/or chitosan; gelatin; shellac; epoxy resins; vinyl polymers; water insoluble inorganics; silicone; and mixtures thereof. Preferred encapsulates comprise perfume. Preferred encapsulates comprise a shell which may comprise melamine formaldehyde and/or cross linked melamine formaldehyde. Preferred encapsulates comprise a core material and a shell, said shell at least partially surrounding said core material, is disclosed. At least 75%, 85% or even 90% of said encapsulates may have a fracture strength of from 0.2 MPa to 10 MPa, and a benefit agent leakage of from 0% to 20%, or even less than 10% or 5% based on total initial encapsulated benefit agent. Preferred are those in which at least 75%, 85% or even 90% of said encapsulates may have (i) a particle size of from 1 microns to 80 microns, 5 microns to 60 microns, from 10 microns to 50 microns, or even from 15 microns to 40 microns, and/or (ii) at least 75%, 85% or even 90% of said encapsulates may have a particle wall thickness of from 30 nm to 250 nm, from 80 nm to 180 nm, or even from 100 nm to 160 nm. Formaldehyde scavengers may be employed with the encapsulates, for example, in a capsule slurry and/or added to a composition before, during or after the encapsulates are added to such composition. Suitable capsules that can be made by following the teaching of U.S. Patent Application Publication No. 2008/0305982 A1; and/or U.S. Patent Application Publication No. 2009/0247449 A1. Alternatively, suitable capsules can be purchased from Appleton Papers Inc. of Appleton, Wis. USA.

In a preferred aspect the composition may comprise a deposition aid, preferably in addition to encapsulates. Preferred deposition aids are selected from the group consisting of cationic and nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or more monomers selected from the group comprising acrylic acid and acrylamide.

Perfume.

Preferred compositions of the invention comprise perfume. Typically the composition comprises a perfume that comprises one or more perfume raw materials, selected from the group as described in WO08/87497. However, any perfume useful in a laundry care composition may be used. A preferred method of incorporating perfume into the compositions of the invention is via an encapsulated perfume particle comprising either a water-soluble hydroxylic compound or melamine-formaldehyde or modified polyvinyl alcohol. In one aspect the encapsulate comprises (a) an at least partially water-soluble solid matrix comprising one or more water-soluble hydroxylic compounds, preferably starch; and (b) a perfume oil encapsulated by the solid matrix. In a further aspect the perfume may be pre-complexed with a polyamine, preferably a polyethylenimine so as to form a Schiff base.

Polymers.

The composition may comprise one or more polymers. Examples are optionally modified carboxymethylcellulose, poly(vinyl-pyrrolidone), poly(ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid copolymers.

The composition may comprise one or more amphiphilic cleaning polymers such as the compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n=from 20 to 30, and x=from 3 to 8, or sulphated or sulphonated variants thereof. In one aspect, this polymer is sulphated or sulphonated to provide a zwitterionic soil suspension polymer.

The composition preferably comprises amphiphilic alkoxylated grease cleaning polymers which have balanced hydrophilic and hydrophobic properties such that they remove grease particles from fabrics and surfaces. Preferred amphiphilic alkoxylated grease cleaning polymers comprise a core structure and a plurality of alkoxylate groups attached to that core structure. These may comprise alkoxylated polyalkylenimines, preferably having an inner polyethylene oxide block and an outer polypropylene oxide block. Typically these may be incorporated into the compositions of the invention in amounts of from 0.005 to 10 wt. %, generally from 0.5 to 8 wt. %.

Alkoxylated polycarboxylates such as those prepared from polyacrylates are useful herein to provide additional grease removal performance. Such materials are described in WO 91/08281 and WO 90/01815. Chemically, these materials comprise polyacrylates having one ethoxy side-chain per every 7-8 acrylate units. The side-chains are of the formula —$(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Mixtures of cosurfactants and other adjunct ingredients, are particularly suited to be used with an amphiphilic graft co-polymer. Preferred amphiphilic graft co-polymer(s) comprise (i) polyethyelene glycol backbone; and (ii) and at least one pendant moiety selected from polyvinyl acetate, polyvinyl alcohol and mixtures thereof. A preferred amphiphilic graft co-polymer is Sokalan HP22, supplied from BASF. Suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone is preferably about 6000 and the weight ratio of the polyethylene oxide to polyvinyl acetate is about 40 to 60 and no more than 1 grafting point per 50 ethylene oxide units. Typically these are incorporated into the compositions of the invention in amounts from 0.005 to 10 wt. %, more usually from 0.05 to 8 wt. %. Preferably the composition comprises one or more carboxylate polymer, such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da. Typically these are incorporated into the compositions of the invention in amounts from 0.005 to 10 wt. %, or from 0.05 to 8 wt. %.

Preferably the composition comprises one or more soil release polymers. Examples include soil release polymers having a structure as defined by one of the following Formulae (MXI), (MXII) or (MXIII):

—[($OCHR^{10}$—$CHR^{11}$)$_a$—O—(O)C—Ar—C(O)—]$_d$ (MXI)

—[($OCHR^{12}$—$CHR^{13}$)$_b$—O—OC-sAr—CO—]$_e$ (MXII)

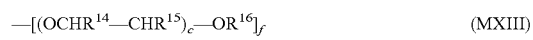

—[($OCHR^{14}$—$CHR^{15}$)$_c$—$OR^{16}$]$_f$ (MXIII)

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^{10}$, $R^{11}$, $R^{12}$, $R^{13}$, $R^{14}$ and $R^{15}$ are independently selected from H or $C_1$-$C_{18}$ n- or iso-alkyl; and $R^{16}$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol.

Preferably the composition comprises one or more cellulosic polymer, including those selected from alkyl cellulose, alkyl alkoxyalkyl cellulose, carboxyalkyl cellulose, alkyl carboxyalkyl cellulose. Preferred cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da.

Enzymes.

Preferably the composition comprises one or more enzymes. Preferred enzymes provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in the composition, the aforementioned additional enzymes may be present at levels from about 0.00001% to about 2%, from about 0.0001% to about 1% or even from about 0.001% to about 0.5% enzyme protein by weight of the composition.

Proteases.

Preferably the composition comprises one or more proteases. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii* described in U.S. Pat. No. 6,312,936 B1, U.S. Pat. Nos. 5,679,630, 4,760,025, 7,262,042 and WO 09/021867.

(b) trypsin-type or chymotrypsin-type proteases, such as trypsin (e.g., of porcine or bovine origin), including the *Fusarium* protease described in WO 89/06270 and the chymotrypsin proteases derived from *Cellumonas* described in WO 05/052161 and WO 05/052146.

(c) metalloproteases, including those derived from *Bacillus amyloliquefaciens* described in WO 07/044993A2.

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Amylases.

Preferably the composition may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1 022 334). Preferred amylases include:

(a) the variants described in WO 94/02597, WO 94/18314, WO 96/23874 and WO 97/43424, especially the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) the variants described in U.S. Pat. No. 5,856,164 and WO 99/23211, WO 96/23873, WO 00/60060 and WO 06/002643, especially the variants with one or more substitutions in the following positions versus the AA560 enzyme listed as SEQ ID No. 12 in WO 06/002643:

26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with SEQ ID No. 4 in WO06/002643, the wild-type enzyme from *Bacillus* SP722, especially variants with deletions in the 183 and 184 positions and variants described in WO 00/60060, which is incorporated herein by reference.

(d) variants exhibiting at least 95% identity with the wild-type enzyme from *Bacillus* sp.707 (SEQ ID NO:7 in U.S. Pat. No. 6,093,562), especially those comprising one or more of the following mutations M202, M208, S255, $R_{172}$, and/or M261. Preferably said amylase comprises one or more of M202L, M202V, M202S, M202T, M202I, M202Q, M202W, S255N and/or R172Q. Particularly preferred are those comprising the M202L or M202T mutations.

(e) variants described in WO 09/149130, preferably those exhibiting at least 90% identity with SEQ ID NO: 1 or SEQ ID NO:2 in WO 09/149130, the wild-type enzyme from *Geobacillus Stearophermophilus* or a truncated version thereof.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

Lipases.

Preferably the invention comprises one or more lipases, including "first cycle lipases" such as those described in U.S. Pat. No. 6,939,702 B1 and U.S. Patent Application Publication No. 2009/0217464. Preferred lipases are first-wash lipases. In one embodiment of the invention the composition comprises a first wash lipase. First wash lipases includes a lipase which is a polypeptide having an amino acid sequence which: (a) has at least 90% identity with the wild-type lipase derived from *Humicola lanuginosa* strain DSM 4109; (b) compared to said wild-type lipase, comprises a substitution of an electrically neutral or negatively charged amino acid at the surface of the three-dimensional structure within 15A of E1 or Q249 with a positively charged amino acid; and (c) comprises a peptide addition at the C-terminal; and/or (d) comprises a peptide addition at the N-terminal and/or (e) meets the following limitations: i) comprises a negative amino acid in position E210 of said wild-type lipase; ii) comprises a negatively charged amino acid in the region corresponding to positions 90-101 of said wild-type lipase; and iii) comprises a neutral or negative amino acid at a position corresponding to N94 or said wild-type lipase and/or has a negative or neutral net electric charge in the region corresponding to positions 90-101 of said wild-type lipase. Preferred are variants of the wild-type lipase from *Thermomyces lanuginosus* comprising one or more of the T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Preferred lipases would include those sold under the tradenames Lipex® and Lipolex® and Lipoclean®.

Endoglucanases.

Other preferred enzymes include microbial-derived endoglucanases exhibiting endo-beta-1,4-glucanase activity (E.C. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403B2) and mixtures thereof. Suitable endoglucanases are sold under the tradenames Celluclean® and Whitezyme® (Novozymes A/S, Bagsvaerd, Denmark).

Pectate Lyases.

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, Calif.).

Bleaching Agents.

It may be preferred for the composition to comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent or mixtures of bleaching agents by weight of the subject composition. Examples of suitable bleaching agents include:

(1) photobleaches for example sulfonated zinc phthalocyanine sulfonated aluminium phthalocyanines, xanthene dyes and mixtures thereof;

(2) pre-formed peracids: Suitable preformed peracids include, but are not limited to compounds selected from the group consisting of pre-formed peroxyacids or salts thereof typically a percarboxylic acids and salts, percarbonic acids and salts, perimidic acids and salts, peroxymonosulfuric acids and salts, for example, Oxone®, and mixtures thereof. Suitable examples include peroxycarboxylic acids or salts thereof, or peroxysulphonic acids or salts thereof. Typical peroxycarboxylic acid salts suitable for use herein have a chemical structure corresponding to the following chemical formula:

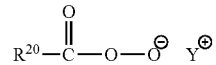

wherein: $R^{20}$ is selected from alkyl, aralkyl, cycloalkyl, aryl or heterocyclic groups; the $R^{20}$ group can be linear or branched, substituted or unsubstituted; having, when the peracid is hydrophobic, from 6 to 14 carbon atoms, or from 8 to 12 carbon atoms and, when the peracid is hydrophilic, less than 6 carbon atoms or even less than 4 carbon atoms and Y is any suitable counter-ion that achieves electric charge neutrality, preferably Y is selected from hydrogen, sodium or potassium. Preferably, $R^{14}$ is a linear or branched, substituted or unsubstituted $C_{6-9}$ alkyl. Preferably, the peroxyacid or salt thereof is selected from peroxyhexanoic acid, peroxyheptanoic acid, peroxyoctanoic acid, peroxynonanoic acid, peroxydecanoic acid, any salt thereof, or any combination thereof. Particularly preferred peroxyacids are phthalimido-peroxy-alkanoic acids, in particular ε-phthalimido peroxy hexanoic acid (PAP). Preferably, the peroxyacid or salt thereof has a melting point in the range of from 30° C. to 60° C. The pre-formed peroxyacid or salt thereof can also be a peroxysulphonic acid or salt thereof, typically having a chemical structure corresponding to the following chemical formula:

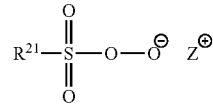

wherein: $R^{21}$ is selected from alkyl, aralkyl, cycloalkyl, aryl or heterocyclic groups; the $R^{21}$ group can be linear or branched, substituted or unsubstituted; and Z is any suitable counter-ion that achieves electric charge neutrality, preferably Z is selected from hydrogen, sodium or potassium. Preferably $R^{21}$ is a linear or branched, substituted or unsubstituted $C_{4-14}$, preferably $C_{6-14}$ alkyl. Preferably such bleach components may be present in the compositions of the invention in an amount from 0.01 to 50%, most preferably from 0.1% to 20%.

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt. %, or 1 to 30 wt. % of the overall fabric and home care product and are typically incorporated into such fabric and home care products as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having $R_{22}$—(C=O)-$L^1$ wherein $R^{22}$ is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and $L^1$ is a leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject composition may comprise NOBS, TAED or mixtures thereof.

(5) Bleach Catalysts. The compositions of the present invention may also include one or more bleach catalysts capable of accepting an oxygen atom from a peroxyacid and/or salt thereof, and transferring the oxygen atom to an oxidizeable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and alpha amino-ketones and mixtures thereof. Suitable alpha amino ketones are for example as described in WO 2012/000846 A1, WO 2008/015443 A1, and WO 2008/014965 A1. Suitable mixtures are as described in U.S. Patent Application Publication No. 2007/0173430 A1. Without wishing to be bound by theory, the inventors believe that controlling the electophilicity and hydrophobicity in this above described manner enables the bleach ingredient to be delivered substantially only to areas of the fabric that are more hydrophobic, and that contain electron rich soils, including visible chromophores, that are susceptible to bleaching by highly electrophilic oxidants. In one aspect, the bleach catalyst has a structure corresponding to general formula below:

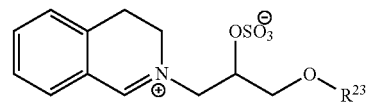

wherein $R^{23}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl;

(6) The composition may preferably comprise catalytic metal complexes. One preferred type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught in WO 00/32601, and U.S. Pat. No. 6,225,464.

When present, the source of hydrogen peroxide/peracid and/or bleach activator is generally present in the composition in an amount of from about 0.1 to about 60 wt. %, from about 0.5 to about 40 wt. % or even from about 0.6 to about 10 wt. % based on the fabric and home care product. One or more hydrophobic peracids or precursors thereof may be used in combination with one or more hydrophilic peracid or precursor thereof.

Typically hydrogen peroxide source and bleach activator will be incorporated together. The amounts of hydrogen peroxide source and peracid or bleach activator may be selected such that the molar ratio of available oxygen (from the peroxide source) to peracid is from 1:1 to 35:1, or even 2:1 to 10:1.

Surfactant.

Preferably the composition comprises a surfactant or surfactant system. The surfactant can be selected from nonionic, anionic, cationic, amphoteric, ampholytic, amphiphilic, zwitterionic, semi-polar nonionic surfactants and mixtures thereof. Preferred compositions comprise a mixture of surfactants/surfactant system. Preferred surfactant systems comprise one or more anionic surfactants, most preferably in combination with a co-surfactant, most preferably a nonionic and/or amphoteric and/or zwitterionic surfactant. Preferred surfactant systems comprise both anionic and nonionic surfactant, preferably in weight ratios from 90:1 to 1:90. In some instances a weight ratio of anionic to nonionic surfactant of at least 1:1 is preferred. However a ratio below 10:1 may be preferred. When present, the total surfactant level is preferably from 0.1% to 60%, from 1% to 50% or even from 5% to 40% by weight of the subject composition.

Preferably the composition comprises an anionic detersive surfactant, preferably sulphate and/or sulphonate surfactants. Preferred examples include alkyl benzene sulphonates, alkyl sulphates and alkyl alkoxylated sulphates. Preferred sulphonates are $C_{10-13}$ alkyl benzene sulphonate. Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

Preferred sulphate detersive surfactants include alkyl sulphate, typically $C_8$-$C_{18}$ alkyl sulphate, or predominantly $C_{12}$ alkyl sulphate. A further preferred alkyl sulphate is alkyl alkoxylated sulphate, preferably a $C_8$-$C_{18}$ alkyl alkoxylated sulphate. Preferably the alkoxylating group is an ethoxylating group. Typically the alkyl alkoxylated sulphate has an average degree of alkoxylation of from 0.5 to 30 or 20, or from 0.5 to 10. Particularly preferred are $C_8$-$C_{18}$ alkyl ethoxylated sulphate having an average degree of ethoxylation of from 0.5 to 10, from 0.5 to 7, from 0.5 to 5 or even from 0.5 to 3.

The alkyl sulphate, alkyl alkoxylated sulphate and alkyl benzene sulphonates may be linear or branched, substituted or un-substituted. When the surfactant is branched, preferably the surfactant will comprise a mid-chain branched sulphate or sulphonate surfactant. Preferably the branching groups comprise $C_1$-$C_4$ alkyl groups, typically methyl and/or ethyl groups.

Preferably the composition comprises a nonionic detersive surfactant. Suitable non-ionic surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein the alkoxylate units may be ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, in one aspect, alkylpolyglycosides; polyhydroxy fatty acid amides; ether capped poly (oxyalkylated) alcohol surfactants; and mixtures thereof.

Suitable non-ionic detersive surfactants include alkyl polyglucoside and/or an alkyl alkoxylated alcohol.

In one aspect, non-ionic detersive surfactants include alkyl alkoxylated alcohols, in one aspect $C_{8-18}$ alkyl alkoxylated alcohol, for example a $C_8$-$C_{18}$ alkyl ethoxylated alcohol, the alkyl alkoxylated alcohol may have an average degree of alkoxylation of from 1 to 80, preferably from 1 to 50, most preferably from 1 to 30, from 1 to 20, or from 1 to 10. In one aspect, the alkyl alkoxylated alcohol may be a $C_8$-$C_{18}$ alkyl ethoxylated alcohol having an average degree of ethoxylation of from 1 to 10, from 1 to 7, more from 1 to 5 or from 3 to 7, or even below 3 or 2. The alkyl alkoxylated alcohol can be linear or branched, and substituted or unsubstituted.

Suitable nonionic surfactants include those with the tradename Lutensol® from BASF.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

$(R^{25})(R^{26})(R^{27})(R^{28})N^+X^-$ wherein, $R^{25}$ is a linear or branched, substituted or unsubstituted $C_6$-$C_{18}$ alkyl or alkenyl moiety, $R^{26}$ and $R^{27}$ are independently selected from methyl or ethyl moieties, $R^{28}$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Suitable amphoteric/zwitterionic surfactants include amine oxides and betaines.

Amine-neutralized anionic surfactants—Anionic surfactants of the present invention and adjunct anionic cosurfactants, may exist in an acid form, and said acid form may be neutralized to form a surfactant salt which is desirable for use in the present detergent compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, or alkanolamines. Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Builders.

Preferably the composition comprises one or more builders or a builder system. When a builder is used, the composition of the invention will typically comprise at least 1%, from 2% to 60% builder. It may be preferred that the composition comprises low levels of phosphate salt and/or zeolite, for example from 1 to 10 or 5 wt. %. The composition may even be substantially free of strong builder; substantially free of strong builder means "no deliberately added" zeolite and/or phosphate. Typical zeolite builders include zeolite A, zeolite P and zeolite MAP. A typical phosphate builder is sodium tri-polyphosphate.

Chelating Agent.

Preferably the composition comprises chelating agents and/or crystal growth inhibitor. Suitable molecules include copper, iron and/or manganese chelating agents and mixtures thereof. Suitable molecules include aminocarboxylates, aminophosphonates, succinates, salts thereof, and mixtures thereof. Non-limiting examples of suitable chelants for use herein include ethylenediaminetetracetates, N-(hydroxyethyl)ethylenediaminetriacetates, nitrilotriacetates, ethylenediamine tetraproprionates, triethylenetetraaminehexacetates, diethylenetriamine-pentaacetates, ethanoldiglycines, ethylenediaminetetrakis(methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), salts thereof, and mixtures thereof. Other nonlimiting examples of chelants of use in the present invention are found in U.S. Pat. Nos. 7,445,644 and 7,585,376 and U.S. Patent Application Publication No. 2009/0176684A1. Other suitable chelating agents for use herein are the commercial DEQUEST series, and chelants from Monsanto, DuPont, and Nalco, Inc.

Dye Transfer Inhibitor (DTI).

The composition may comprise one or more dye transfer inhibiting agents. In one embodiment of the invention the inventors have surprisingly found that compositions comprising polymeric dye transfer inhibiting agents in addition to the specified dye give improved performance. This is surprising because these polymers prevent dye deposition. Suitable dye transfer inhibitors include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Suitable examples include PVP-K15, PVP-K30, ChromaBond S-400, ChromaBond S-403E and Chromabond S-100 from Ashland Aqualon, and Sokalan HP165, Sokalan HP50, Sokalan HP53, Sokalan HP59, Sokalan® HP 56K, Sokalan® HP 66 from BASF. Other suitable DTIs are as described in WO2012/004134. When present in a subject composition, the dye transfer inhibiting agents may be present at levels from about 0.0001% to about 10%, from about 0.01% to about 5% or even from about 0.1% to about 3% by weight of the composition.

Fluorescent Brightener.

Preferably the composition comprises one or more fluorescent brightener. Commercial optical brighteners which may be useful in the present invention can be classified into subgroups, which include, but are not limited to, derivatives of stilbene, pyrazoline, coumarin, carboxylic acid, methinecyanines, dibenzothiophene-5,5-dioxide, azoles, 5- and 6-membered-ring heterocycles, and other miscellaneous agents. Particularly preferred brighteners are selected from: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)]amino}stilbene-2-2-disulfonate, disodium 4,4'-bis{[(4-anilino-6-morpholino-I, 3,5-triazin-2-yl)]amino}stilbene-2-2'disulfonate, and disodium 4,4'-bis(2-sulfostyryl)biphenyl. Other examples of such brighteners are disclosed in "The Production and Application of Fluorescent Brightening Agents", M. Zahradnik, Published by John Wiley & Sons, New York (1982). Specific nonlimiting examples of optical brighteners which are useful in the present compositions are those identified in U.S. Pat. Nos. 4,790,856 and 3,646,015. Suitable optical brighteners also include compounds selected from the above-identified groups which have been substituted with one or more oligomeric or polymeric chains, such as one or more oxyalkylene chains. Suitable examples of such optical brighteners are disclosed in U.S. Pat. Nos. 8,262,743, 9,018, 151, 8,262,744, 8,454,711, and 8,740,997.

A preferred brightener has the structure below:

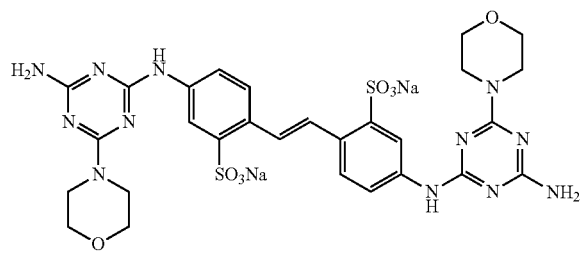

Suitable fluorescent brightener levels include lower levels of from about 0.01, from about 0.05, from about 0.1 or even from about 0.2 wt % to upper levels of 0.5 or even 0.75 wt %.

In one aspect the brightener may be loaded onto a clay to form a particle.

Preferred brighteners are totally or predominantly (typically at least 50 wt. %, at least 75 wt. %, at least 90 wt. %, at least 99 wt. %), in alpha-crystalline form. A highly preferred brightener comprises C.I. fluorescent brightener 260, preferably having the following structure:

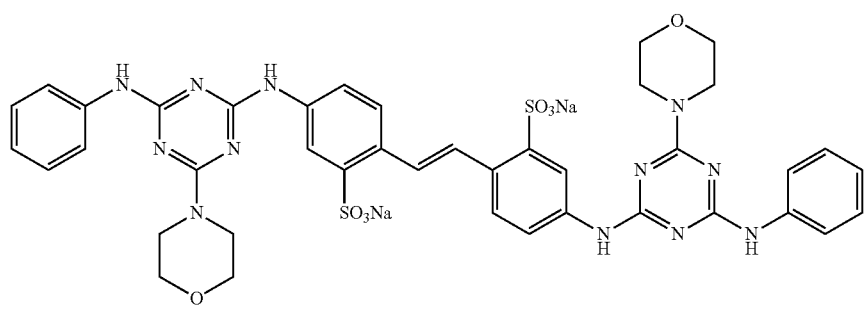

This can be particularly useful as it dissolves well in cold water, for example below 30 or 25 or even 20° C.

Preferably brighteners are incorporated in the composition in micronized particulate form, most preferably having a weight average primary particle size of from 3 to 30 micrometers, from 3 micrometers to 20 micrometers, or from 3 to 10 micrometers.

The composition may comprise C.I. fluorescent brightener 260 in beta-crystalline form, and the weight ratio of: (i) C.I. fluorescent brightener 260 in alpha-crystalline form, to (ii) C.I. fluorescent brightener 260 in beta-crystalline form may be at least 0.1, or at least 0.6.

BE 680847 relates to a process for making C.I fluorescent brightener 260 in alpha-crystalline form.

Silicate Salts.

The composition may preferably also contain silicate salts, such as sodium or potassium silicate. The composition may comprise from 0 wt. % to less than 10 wt. % silicate salt, to 9 wt. %, or to 8 wt. %, or to 7 wt. %, or to 6 wt. %, or to 5 wt. %, or to 4 wt. %, or to 3 wt. %, or even to 2 wt. %, and preferably from above 0 wt. %, or from 0.5 wt. %, or even from 1 wt. % silicate salt. A suitable silicate salt is sodium silicate.

Dispersants.

The composition may preferably also contain dispersants. Suitable water-soluble organic materials include the homo- or co-polymeric acids or their salts, in which the polycarboxylic acid comprises at least two carboxyl radicals separated from each other by not more than two carbon atoms.

Enzyme Stabilisers.

The composition may preferably comprise enzyme stabilizers. Any conventional enzyme stabilizer may be used, for example by the presence of water-soluble sources of calcium and/or magnesium ions in the finished fabric and home care products that provide such ions to the enzymes. In case of aqueous compositions comprising protease, a reversible protease inhibitor, such as a boron compound including borate, or preferably 4-formyl phenylboronic acid, phenylboronic acid and derivatives thereof, or compounds such as calcium formate, sodium formate and 1,2-propane diol can be added to further improve stability.

Solvent System.

The solvent system in the present compositions can be a solvent system containing water alone or mixtures of organic solvents either without or preferably with water. Preferred organic solvents include 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the invention, but more typically are present at levels in the range of from about 0.1% to about 98%, preferably at least about 1% to about 50%, more usually from about 5% to about 25%.

In some embodiments of the invention, the composition is in the form of a structured liquid. Such structured liquids can either be internally structured, whereby the structure is formed by primary ingredients (e.g. surfactant material) and/or externally structured by providing a three dimensional matrix structure using secondary ingredients (e.g. polymers, clay and/or silicate material), for use e.g. as thickeners. The composition may comprise a structurant, preferably from 0.01 wt. % to 5 wt. %, from 0.1 wt. % to 2.0 wt. % structurant. Examples of suitable structurants are given in U.S. Patent Application Publication No. 2006/0205631A1, U.S. Patent Application Publication No. 2005/0203213A1, U.S. Pat. Nos. 7,294,611, 6,855,680. The structurant is typically selected from the group consisting of diglycerides and triglycerides, ethylene glycol distearate, microcrystalline cellulose, cellulose-based materials, microfiber cellulose, hydrophobically modified alkali-swellable emulsions such as Polygel W30 (3VSigma), biopolymers, xanthan gum, gellan gum, hydrogenated castor oil, derivatives of hydrogenated castor oil such as non-ethoxylated derivatieves thereof and mixtures thereof, in particular, those selected from the group of hydrogenated castor oil, derivatives of hydrogenated castor oil, microfibullar cellulose, hydroxyfunctional crystalline materials, long chain fatty alcohols, 12-hydroxystearic acids, clays and mixtures thereof. A preferred structurant is described in. U.S. Pat. No. 6,855,680 which defines suitable hydroxyfunctional crystalline materials in detail. Preferred is hydrogenated castor oil. Non-limiting examples of useful structurants include. Such structurants have a thread-like structuring system having a range of aspect ratios. Other suitable structurants and the processes for making them are described in WO 2010/034736.

The composition of the present invention may comprise a high melting point fatty compound. The high melting point fatty compound useful herein has a melting point of 25° C. or higher, and is selected from the group consisting of fatty alcohols, fatty acids, fatty alcohol derivatives, fatty acid derivatives, and mixtures thereof. Such compounds of low melting point are not intended to be included in this section. Non-limiting examples of the high melting point compounds are found in International Cosmetic Ingredient Dictionary, Fifth Edition, 1993, and CTFA Cosmetic Ingredient Handbook, Second Edition, 1992. When present, the high melting point fatty compound is preferably included in the composition at a level of from 0.1% to 40%, preferably from 1% to 30%, more preferably from 1.5% to 16% by weight of the composition, from 1.5% to 8% in view of providing improved conditioning benefits such as slippery feel during the application to wet hair, softness and moisturized feel on dry hair.

Cationic Polymer.

The compositions of the present invention may contain a cationic polymer. Concentrations of the cationic polymer in the composition typically range from 0.05% to 3%, in another embodiment from 0.075% to 2.0%, and in yet another embodiment from 0.1% to 1.0%. Suitable cationic polymers will have cationic charge densities of at least 0.5 meq/gm, in another embodiment at least 0.9 meq/gm, in another embodiment at least 1.2 meq/gm, in yet another embodiment at least 1.5 meq/gm, but in one embodiment also less than 7 meq/gm, and in another embodiment less than 5 meq/gm, at the pH of intended use of the composition, which pH will generally range from pH 3 to pH 9, in one embodiment between pH 4 and pH 8. Herein, "cationic charge density" of a polymer refers to the ratio of the number of positive charges on the polymer to the molecular weight of the polymer. The average molecular weight of such suitable cationic polymers will generally be between 10,000 and 10 million, in one embodiment between 50,000 and 5 million, and in another embodiment between 100,000 and 3 million.

Suitable cationic polymers for use in the compositions of the present invention contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair product performance, stability or aesthetics. Nonlimiting examples of such counterions include halides (e.g., chloride, fluoride, bromide, iodide), sulfate and methylsulfate.

Nonlimiting examples of such polymers are described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)).

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition.

Suitable cationic polymers are described in U.S. Pat. Nos. 3,962,418 and 3,958,581; and U.S. Patent Application Publication No. 2007/0207109A1.

Nonionic Polymer.

The composition of the present invention may include a nonionic polymer as a conditioning agent. Polyalkylene glycols having a molecular weight of more than 1,000 are nonionic polymers suitable for use as such a condition agent. Useful are those having the following general formula:

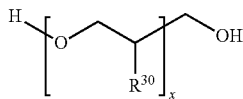

wherein each $R^{30}$ is selected from the group consisting of hydrogen and methyl, and x is a positive integer having a value great enough to yield the desired molecular weight. Conditioning agents, and in particular silicones, may be included in the composition. The conditioning agents useful in the compositions of the present invention typically comprise a water insoluble, water dispersible, non-volatile, liquid that forms emulsified, liquid particles. Suitable conditioning agents for use in the composition are those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. Such conditioning agents should be physically and chemically compatible with the essential components of the composition, and should not otherwise unduly impair product stability, aesthetics or performance.

The concentration of the conditioning agent in the composition should be sufficient to provide the desired conditioning benefits. Such concentration can vary with the conditioning agent, the conditioning performance desired, the average size of the conditioning agent particles, the type and concentration of other components, and other like factors.

The concentration of the silicone conditioning agent typically ranges from about 0.01% to about 10%. Non-limiting examples of suitable silicone conditioning agents, and optional suspending agents for the silicone, are described in U.S. Reissue Pat. No. 34,584, U.S. Pat. Nos. 5,104,646; 5,106,609; 4,152,416; 2,826,551; 3,964,500; 4,364,837; 6,607,717; 6,482,969; 5,807,956; 5,981,681; 6,207,782; 7,465,439; 7,041,767; 7,217,777; U.S. Patent Application Publication Nos. 2007/0286837A1; 2005/0048549A1; 2007/0041929A1; British Pat. No. 849,433; German Patent No. DE 10036533, which are all incorporated herein by reference; Chemistry and Technology of Silicones, New York: Academic Press (1968); General Electric Silicone Rubber Product Data Sheets SE 30, SE 33, SE 54 and SE 76; Silicon Compounds, Petrarch Systems, Inc. (1984); and in Encyclopedia of Polymer Science and Engineering, vol. 15, 2d ed., pp 204-308, John Wiley & Sons, Inc. (1989).

Organic Conditioning Oil.

The compositions of the present invention may also comprise from about 0.05% to about 3% of at least one organic conditioning oil as the conditioning agent, either alone or in combination with other conditioning agents, such as the silicones (described herein). Suitable conditioning oils include hydrocarbon oils, polyolefins, and fatty esters. Also suitable for use in the compositions herein are the conditioning agents described by the Procter & Gamble Company in U.S. Pat. Nos. 5,674,478, and 5,750,122. Also suitable for use herein are those conditioning agents described in U.S. Pat. Nos. 4,529,586; 4,507,280; 4,663,158; 4,197,865; 4,217,914; 4,381,919; and 4,422,853.

Hygiene Agent.

The compositions of the present invention may also comprise components to deliver hygiene and/or malodour benefits such as one or more of zinc ricinoleate, thymol, quaternary ammonium salts such as Bardac®, polyethylenimines (such as Lupasol® from BASF) and zinc complexes thereof, silver and silver compounds, especially those designed to slowly release Ag+ or nano-silver dispersions.

Probiotics.

The composition may comprise probiotics, such as those described in WO 2009/043709.

Suds Boosters.

The composition may preferably comprise suds boosters if high sudsing is desired. Suitable examples are the $C_{10}$-$C_{16}$ alkanolamides or $C_{10}$-$C_{14}$ alkyl sulphates, which are preferably incorporated at 1%-10% levels. The $C_{10}$-$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, water-soluble magnesium and/or calcium salts such as $MgCl_2$, $MgSO_4$, $CaCl_2$, $CaSO_4$ and the like, can be added at levels of, typically, 0.1%-2%, to provide additional suds and to enhance grease removal performance.

Suds Supressor.

Compounds for reducing or suppressing the formation of suds may be incorporated into the compositions of the present invention. Suds suppression can be of particular importance in the so-called "high concentration cleaning process" as described in U.S. Pat. Nos. 4,489,455 and 4,489,574, and in front-loading-style washing machines. A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). Examples of suds supressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100°

C., silicone suds suppressors, and secondary alcohols. Suds supressors are described in U.S. Pat. Nos. 2,954,347; 4,265,779; 4,265,779; 3,455,839; 3,933,672; 4,652,392; 4,978,471; 4,983,316; 5,288,431; 4,639,489; 4,749,740; 4,798,679; and 4,075,118; European Patent Application No. 89307851.9; EP 150 872; and DOS 2,124,526.

For any detergent compositions to be used in automatic laundry washing machines, suds should not form to the extent that they overflow the washing machine. Suds suppressors, when utilized, are preferably present in a "suds suppressing amount. By "suds suppressing amount" is meant that the formulator of the composition can select an amount of this suds controlling agent that will sufficiently control the suds to result in a low-sudsing laundry detergent for use in automatic laundry washing machines. The compositions herein will generally comprise from 0% to 10% of suds suppressor. When utilized as suds suppressors, monocarboxylic fatty acids, and salts therein, will be present typically in amounts up to 5%, by weight, of the detergent composition. Preferably, from 0.5% to 3% of fatty monocarboxylate suds suppressor is utilized. Silicone suds suppressors are typically utilized in amounts up to 2.0%, by weight, of the detergent composition, although higher amounts may be used. Monostearyl phosphate suds suppressors are generally utilized in amounts ranging from 0.1% to 2%, by weight, of the composition. Hydrocarbon suds suppressors are typically utilized in amounts ranging from 0.01% to 5.0%, although higher levels can be used. The alcohol suds suppressors are typically used at 0.2%-3% by weight of the finished compositions.

Pearlescent Agents.

Pearlescent agents as described in WO2011/163457 may be incorporated into the compositions of the invention.

Perfume.

Preferably the composition comprises a perfume, preferably in the range from 0.001 to 3 wt. %, most preferably from 0.1 to 1 wt. %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co. It is usual for a plurality of perfume components to be present in the compositions of the invention, for example four, five, six, seven or more. In perfume mixtures preferably 15 to 25 wt. % are top notes. Top notes are defined by Poucher (Journal of the Society of Cosmetic Chemists 6(2):80 [1995]). Preferred top notes include rose oxide, citrus oils, linalyl acetate, lavender, linalool, dihydromyrcenol and cis-3-hexanol.

Packaging.

Any conventional packaging may be used and the packaging may be fully or partially transparent so that the consumer can see the color of the product which may be provided or contributed to by the color of the dyes essential to the invention. UV absorbing compounds may be included in some or all of the packaging.

Process of Making Compositions.

The compositions of the invention may be in any useful form, as described above. They may be made by any process chosen by the formulator, non-limiting examples of which are described in the examples and in U.S. Pat. No. 4,990,280; U.S. Patent Application Publication No. 2003/0087791 A1; U.S. Patent Application Publication No. 2003/0087790A1; U.S. Patent Application Publication No. 2005/0003983A1; U.S. Patent Application Publication No. 2004/0048764A1; U.S. Pat. Nos. 4,762,636; 6,291,412; U.S. Patent Application Publication No. 20050227891A1; EP 1070115A2; U.S. Pat. Nos. 5,879,584; 5,691,297; 5,574,005; U.S. Pat. Nos. 5,569,645; 5,565,422; 5,516,448; and 5,489,392.

When in the form of a liquid, the laundry care compositions of the invention may be aqueous (typically above 2 wt. % or even above 5 or 10 wt. % total water, up to 90 or up to 80 wt. % or 70 wt. % total water) or non-aqueous (typically below 2 wt. % total water content). Typically the compositions of the invention will be in the form of an aqueous solution or uniform dispersion or suspension of surfactant, shading dye, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable. When in the form of a liquid, the laundry care compositions of the invention preferably have viscosity from 1 to 1500 centipoises (1-1500 mPa*s), more preferably from 100 to 1000 centipoises (100-1000 mPa*s), and most preferably from 200 to 500 centipoises (200-500 mPa*s) at 20 s-1 and 21° C. Viscosity can be determined by conventional methods. Viscosity may be measured using an AR 550 rheometer from TA instruments using a plate steel spindle at 40 mm diameter and a gap size of 500 The high shear viscosity at 20 s-1 and low shear viscosity at 0.05-1 can be obtained from a logarithmic shear rate sweep from 0.1-1 to 25-1 in 3 minutes time at 21 C. The preferred rheology described therein may be achieved using internal existing structuring with detergent ingredients or by employing an external rheology modifier. More preferably the laundry care compositions, such as detergent liquid compositions have a high shear rate viscosity of from about 100 centipoise to 1500 centipoise, more preferably from 100 to 1000 cps. Unit Dose laundry care compositions, such as detergent liquid compositions have high shear rate viscosity of from 400 to 1000 cps. Laundry care compositions such as laundry softening compositions typically have high shear rate viscosity of from 10 to 1000, more preferably from 10 to 800 cps, most preferably from 10 to 500 cps. Hand dishwashing compositions have high shear rate viscosity of from 300 to 4000 cps, more preferably 300 to 1000 cps.

The liquid compositions, preferably liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid compositions, the dye is first combined with one or more liquid components to form a dye premix, and this dye premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the dye premix and the enzyme component are added at a final stage of component additions. In another aspect, the dye is encapsulated prior to addition to the detergent composition, the encapsulated dye is suspended in a structured liquid, and the suspension is added to a composition formulation containing a substantial portion of the balance of components of the laundry detergent composition.

Pouches.

In a preferred embodiment of the invention, the composition is provided in the form of a unitized dose, either tablet form or preferably in the form of a liquid/solid (optionally granules)/gel/paste held within a water-soluble film in what is known as a pouch or pod. The composition can be encapsulated in a single or multi-compartment pouch. Multi-compartment pouches are described in more detail in EP 2133410 A. When the composition is present in a multi-compartment pouch, the composition of the invention may be in one or two or more compartments, thus the dye may be present in one or more compartments, optionally all compartments. Non-shading dyes or pigments or other aesthetics may also be used in one or more compartments. In one embodiment the composition is present in a single compartment of a multi-compartment pouch.

Suitable film for forming the pouches is soluble or dispersible in water, and preferably has a water-solubility/dispersibility of at least 50%, preferably at least 75% or even at least 95%, as measured by the method set out here after using a glass-filter with a maximum pore size of 20 microns: 50 grams±0.1 gram of pouch material is added in a pre-weighed 400 ml beaker and 245 ml±1 ml of distilled water is added. This is stirred vigorously on a magnetic stirrer set at 600 rpm for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are polymeric materials. The film material can be obtained, for example, by casting, blow-moulding, extrusion or blown extrusion of the polymeric material, as known in the art. Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed in making the compartments of the present invention. A benefit in selecting different films is that the resulting compartments may exhibit different solubility or release characteristics.

Most preferred film materials are PVA films known under the MonoSol trade reference M8630, M8900, H8779 (as described in the Applicants co-pending applications ref 44528 and 11599) and those described in U.S. Pat. Nos. 6,166,117 and 6,787,512 and PVA films of corresponding solubility and deformability characteristics.

The film material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

Process for Making the Water-Soluble Pouch.

The compositions of the invention in pouch form may be made using any suitable equipment and method. However the multi-compartment pouches are preferably made using the horizontal form filling process. The film is preferably wetting, more preferably heated to increase the malleability thereof. Even more preferably, the method also involves the use of a vacuum to draw the film into a suitable mold. The vacuum drawing the film into the mold can be applied for 0.2 to 5 seconds, preferably 0.3 to 3 or even more preferably 0.5 to 1.5 seconds, once the film is on the horizontal portion of the surface. This vacuum may preferably be such that it provides an under-pressure of between −100 mbar to −1000 mbar, or even from −200 mbar to −600 mbar.

The molds, in which the pouches are made, can have any shape, length, width and depth, depending on the required dimensions of the pouches. The molds can also vary in size and shape from one to another, if desirable. For example, it may be preferred that the volume of the final pouches is between 5 and 300 ml, or even 10 and 150 ml or even 20 and 100 ml and that the mold sizes are adjusted accordingly.

Heat can be applied to the film, in the process commonly known as thermoforming, by any means. For example the film may be heated directly by passing it under a heating element or through hot air, prior to feeding it onto the surface or once on the surface. Alternatively it may be heated indirectly, for example by heating the surface or applying a hot item onto the film. Most preferably the film is heated using an infrared light. The film is preferably heated to a temperature of 50 to 120° C., or even 60 to 90° C. Alternatively, the film can be wetted by any mean, for example directly by spraying a wetting agent (including water, solutions of the film material or plasticizers for the film material) onto the film, prior to feeding it onto the surface or once on the surface, or indirectly by wetting the surface or by applying a wet item onto the film.

In the case of pouches comprising powders it is advantageous to pin prick the film for a number of reasons: (a) to reduce the possibility of film defects during the pouch formation, for example film defects giving rise to rupture of the film can be generated if the stretching of the film is too fast; (b) to permit the release of any gases derived from the product enclosed in the pouch, as for example oxygen formation in the case of powders containing bleach; and/or (c) to allow the continuous release of perfume. Moreover, when heat and/or wetting is used, pin pricking can be used before, during or after the use of the vacuum, preferably during or before application of the vacuum. Preferred is thus that each mold comprises one or more holes which are connected to a system which can provide a vacuum through these holes, onto the film above the holes, as described herein in more detail.

Once a film has been heated/wetted, it is drawn into an appropriate mold, preferably using a vacuum. The filling of the moulded film can be done by any known method for filling (moving) items. The most preferred method will depend on the product form and speed of filling required. Preferably the moulded film is filled by in-line filling techniques. The filled, open pouches are then closed, using a second film, by any suitable method. Preferably, this is also done while in horizontal position and in continuous, constant motion. Preferably the closing is done by continuously feeding a second material or film, preferably water-soluble film, over and onto the web of open pouches and then preferably sealing the first film and second film together, typically in the area between the molds and thus between the pouches.

Preferred methods of sealing include heat sealing, solvent welding, and solvent or wet sealing. It is preferred that only the area which is to form the seal, is treated with heat or solvent. The heat or solvent can be applied by any method, preferably on the closing material, preferably only on the areas which are to form the seal. If solvent or wet sealing or welding is used, it may be preferred that heat is also applied. Preferred wet or solvent sealing/welding methods include applying selectively solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches can then be cut by a cutting device. Cutting can be done using any known method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area.

The different compartments of a multi-compartment pouch may be made together in a side-by-side style and consecutive pouches are not cut. Alternatively, the compartments can be made separately. According to this process and preferred arrangement, the pouches are made according to the process comprising the steps of:
  (a) forming an first compartment (as described above);
  (b) forming a recess within some or all of the closed compartment formed in step (a), to generate a second moulded compartment superposed above the first compartment;
  (c) filling and closing the second compartments by means of a third film;
  (d) sealing said first, second and third films; and
  (e) cutting the films to produce a multi-compartment pouch.

Said recess formed in step b is preferably achieved by applying a vacuum to the compartment prepared in step a).

Alternatively the second, and optionally third, compartment(s) can be made in a separate step and then combined with the first compartment as described in European Patent Application No. EP 08101442.5 which is incorporated herein by reference. A particularly preferred process comprises the steps of:
  (a) forming a first compartment, optionally using heat and/or vacuum, using a first film on a first forming machine;
  (b) filling said first compartment with a first composition;
  (c) on a second forming machine, deforming a second film, optionally using heat and vacuum, to make a second and optionally third moulded compartment;
  (d) filling the second and optionally third compartments;
  (e) sealing the second and optionally third compartment using a third film;
  (f) placing the sealed second and optionally third compartments onto the first compartment;
  (g) sealing the first, second and optionally third compartments; and
  (h) cutting the films to produce a multi-compartment pouch.

The first and second forming machines are selected based on their suitability to perform the above process. The first forming machine is preferably a horizontal forming machine. The second forming machine is preferably a rotary drum forming machine, preferably located above the first forming machine.

It will be understood moreover that by the use of appropriate feed stations, it is possible to manufacture multi-compartment pouches incorporating a number of different or distinctive compositions and/or different or distinctive liquid, gel or paste compositions.

Solid Form.

As noted previously, the laundry care compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the dye is provided in particulate form, optionally including additional but not all components of the laundry detergent composition. The dye particulate is combined with one or more additional particulates containing a balance of components of the laundry detergent composition. Further, the dye, optionally including additional but not all components of the laundry detergent composition, may be provided in an encapsulated form, and the shading dye encapsulate is combined with particulates containing a substantial balance of components of the laundry detergent composition. Suitable pre-mix particles for incorporation of dyes/benefit agents into laundry care compositions of the invention are described for example in WO 2010/084039, WO 2007/039042, WO 2010/022775, WO 2009/132870, WO 2009/087033, WO 2007/006357, WO 2007/039042, WO 2007/096052, WO 2011/020991, WO 2006/053598, WO 2003/018740 and WO 2003/018738.

In a second embodiment, the invention provides a method for treating textile articles or fabrics. In general, the method comprises the steps of: (a) providing a laundry care composition as described above; (b) adding the laundry care composition to a liquid medium; and (c) placing the textile articles in the liquid medium. The method is preferably performed under conditions sufficient to convert the compound conforming to a structure selected from the group consisting of Formulae (I)-(XC) from the unconjugated state represented by the structure to a conjugated state.

The compositions of this invention, prepared as hereinbefore described, can be used to form aqueous washing/treatment solutions for use in the laundering/treatment of fabrics. Generally, an effective amount of such compositions is added to water, for example in a conventional fabric automatic washing machine, to form such aqueous laundering solutions. The aqueous washing solution so formed is then contacted, typically under agitation, with the fabrics to be laundered/treated therewith. An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Typically, the wash liquor is formed by contacting the laundry care composition with wash water in such an amount so that the concentration of the laundry care composition in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l. The method of laundering fabric or textile may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 liters or less of water, or 30 liters or less, or 20 liters or less, or 10 liters or less, or 8 liters or less, or even 6 liters or less of water. The wash liquor may comprise from above 0 to 15 liters, or from 2 liters, and to 12 liters, or even to 8 liters of water. Typically from 0.01 kg to 2 kg of fabric per liter of wash liquor is dosed into said wash liquor. Typically from 0.01 kg, or from 0.05 kg, or from 0.07 kg, or from 0.10 kg, or from 0.15 kg, or from 0.20 kg, or from 0.25 kg fabric per liter of wash liquor is dosed into said wash liquor. Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Typically the wash liquor comprising the laundry care composition of the invention has a pH of from 3 to 11.5.

In one aspect, such method comprises the steps of optionally washing and/or rinsing said surface or fabric, contacting said surface or fabric with any composition disclosed in this specification then optionally washing and/or rinsing said surface or fabric is disclosed, with an optional drying step.

Drying of such surfaces or fabrics may be accomplished by any one of the common means employed either in domestic or industrial settings. The fabric may comprise any fabric capable of being laundered in normal consumer or institutional use conditions, and the invention is particularly suitable for synthetic textiles such as polyester and nylon and especially for treatment of mixed fabrics and/or fibres comprising synthetic and cellulosic fabrics and/or fibres. As examples of synthetic fabrics are polyester, nylon, these may be present in mixtures with cellulosic fibres, for example, polycotton fabrics. The solution typically has a pH of from 7 to 11, more usually 8 to 10.5. The compositions are typically employed at concentrations from 500 ppm to 5,000 ppm in solution. The water temperatures typically range from about 5° C. to about 90° C. The water to fabric ratio is typically from about 1:1 to about 30:1.

The change in color state can occur at any suitable point in the method describe above. For example, the compound can change from the first color state to the second color state while the fabric is being contacted with the composition, such as during the wash or rinse cycles of a laundering process. Alternatively, the compound can undergo the color change when the fabric is exposed to heat during the drying step or to ultraviolet light when the fabric is later exposed to sunlight (e.g., exposure to sunlight from line drying or wearing the fabric outside).

Example 1

This example demonstrates the production of 6-(dimethylamino)-3-[p-(dimethylamino)phenyl]phthalide, which has the following structure:

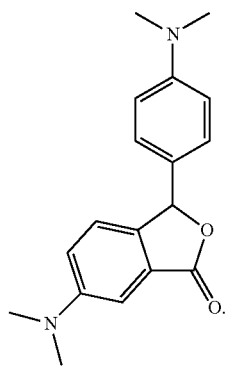 [SMILES: CN(C)c1ccc(C2OC(=O)c3cc(N(C)C)ccc32)cc1]

This compound is a useful intermediate in the production of compounds that are suitable for use in the laundry care compositions described herein.

First, in a 1 L three-neck flask with a condenser, mechanical stirrer, thermal couple, and a $N_2$ inlet, 74.5 gram of 4-dimethylaminobenzaldehyde, 82.5 gram of 3-dimethylaminobenzoic acid, and 250 mL of acetic anhydride were added and heated to reflux for 6 hours. The mixture was cooled to below 80° C. 45 mL of water was added, and the contents of the flask were stirred for 2 hours. The contents of the flash were then cooled to room temperature, and 250 mL of methanol was added. While the contents of the flask were stirred, a solid formed which was later collected by filtration. The recovered solid product was washed with methanol, and then dried in a vacuum oven at 60° C.

Example 2

This example demonstrates the production of 5-(Dimethylamino)-2-[p-(dimethylamino)benzoyl]benzoic acid, which has the following structure:

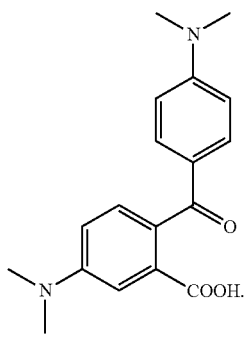 [SMILES: CN(C)c1ccc(C(=O)c2ccc(N(C)C)cc2C(=O)O)cc1]

This compound is a useful intermediate in the production of compounds that are suitable for use in the laundry care compositions described herein.

In a 250 mL three-neck flask with a condenser, mechanical stirrer, thermal couple, and $N_2$ inlet, 10 gram of 6-(dimethylamino)-3-[p-(dimethylamino)phenyl]phthalide and 40 mL of 10% NaOH solution were added. The contents of the flask were heated to 90° C. and stirred for about 1 hour until a clear solution was obtained. Then, 10 grams of sodium m-nitrobenzenesulfonate was added to the solution. The contents of the reactor were heated to reflux for 15 hours and then cooled to room temperature. The contents of the flask were filtered to remove any solid. Then, the filtrate was adjusted to a pH of about 4.0 by adding acetic acid. After cooling the contents to room temperature, a precipitate formed. The precipitate was collected by filtration, washed with water, and dried in vacuum at about 60° C.

Example 3

This example demonstrates the production of several compounds that are believed to be suitable for use in the laundry care compositions described herein.

In order to produce each compound, 40 mmol of 5-(Dimethylamino)-2-[p-(dimethylamino)benzoyl]benzoic acid, 40 mmol of a substituted aniline derivative (described below), and 20 mL of acetic anhydride were added to a 250 mL three-neck flask. The contents of the flask were heated to 100° C. and stirred for 5 hours. The resulting compound was then collected by rotational evaporation.

The substituted aniline derivative used in the reaction described above conforms to the following general structure:

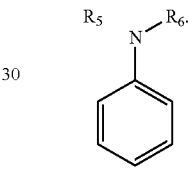

$R_5$ and $R_6$ are selected from the various groups described above. Table 1 shows the structures of specific substituted aniline derivatives used to produce compounds using the synthetic process described above. Table 2 shows the structure of the resulting phtalide compound.

TABLE 1

Structures of substituted aniline derivatives used in the reactions.

| Sample | Structure of substituted aniline derivative |
|---|---|
| 3A | |
| 3B | |

TABLE 1-continued

Structures of substituted aniline derivatives used in the reactions.

| Sample | Structure of substituted aniline derivative |
|---|---|
| 3C | [chemical structure: acetate-O-CH₂CH₂-(O-CH₂CH₂)₈-O-CH₂CH₂-N(Ph)-CH₂CH₂-O-(CH₂CH₂-O)₈-CH₂CH₂-O-acetate] |
| 3D | [chemical structure: acetate-O-CH₂CH₂-(O-CH₂CH₂)₁₃-O-CH₂CH₂-N(Ph)-CH₂CH₂-O-(CH₂CH₂-O)₁₃-CH₂CH₂-O-acetate] |
| 3E | [chemical structure: acetate-O-CH₂CH₂-O-CH₂CH₂-(O-CH(CH₃)CH₂)₇₋₅-O-CH₂CH₂-N(Ph)-CH₂CH₂-O-(CH₂CH(CH₃)-O)₇₋₅-CH₂CH₂-O-CH₂CH₂-O-acetate] |

TABLE 2

Structures of resulting phthalide compounds.

| Sample | Structure of resulting phthalide compound |
|---|---|
| 3A | [phthalide structure with N,N-dimethylamino groups and PEG-acetate chains on aniline nitrogen] |
| 3B | [phthalide structure with PEG-acetate chains (n=3) on aniline nitrogen and N,N-dimethylamino groups] |

TABLE 2-continued

Structures of resulting phthalide compounds.

| Sample | Structure of resulting phthalide compound |
|---|---|
| 3C | *(structure)* |
| 3D | *(structure)* |
| 3E | *(structure)* |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A laundry care composition comprising a laundry care ingredient and at least one compound conforming to the structure of Formula (I) below

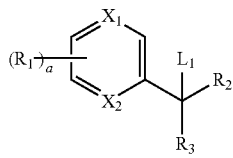
(I)

wherein $X_1$ and $X_2$ are selected from the group consisting of a carbon atom and a nitrogen atom; a is an integer from 0 to 5, provided a is an integer from 0 to 4 when one of $X_1$ and $X_2$ is a nitrogen atom and a is an integer from 0 to 3 when both $X_1$ and $X_2$ are nitrogen atoms; each $R_1$ is independently selected from the group consisting of halogens, a hydroxy group, a nitro group, alkyl groups, substituted alkyl groups, —S(O)$_2$OH, —S(O)$_2$O$^-$[M$^+$], —C(O)OR$_5$, —C(O)R$_5$, —C(O)NR$_5$R$_6$, —NC(O)OR$_5$, —NC(O)SR$_5$, —OR$_5$, —NR$_5$R$_6$, —S(O)$_2$R$_5$, —S(O)$_2$NR$_5$R$_6$, and —P(O)$_2$R$_5$; M is a cation; $R_5$ and $R_6$ are independently selected from the group consisting of hydrogen, alkyl groups, substituted alkyl groups, aryl groups, substituted aryl groups, and $R_a$; $R_2$ and $R_3$ are independently selected from the group consisting of aryl groups, substituted aryl groups, heteroaryl groups, and substituted heteroaryl groups, provided at least one of $R_2$ and $R_3$ is a heteroaryl group or a substituted heteroaryl group when both $X_1$ and $X_2$ are carbon atoms; $L_1$ is selected from the group consisting of hydrogen, halogens, a hydroxy group, a cyano group, and —OR$_8$; $R_8$ is selected from the group consisting of alkyl groups and substituted alkyl groups;

wherein $R_a$ is selected from the group consisting of —R$_x$—O—R$_y$—R$_z$ and —R$_y$—R$_z$; $R_x$ is selected from the group consisting of alkanediyl groups and arenediyl groups; $R_z$ is selected from the group consisting of hydrogen, alkyl groups, substituted alkyl groups, acyl groups, and $R_b$; $R_b$ is a monovalent group conforming to the structure of Formula (I); and $R_y$ is a divalent substituent selected from the group consisting of:

(i) divalent substituents comprising two or more divalent repeating units independently selected from repeating units conforming to the structure of Formula (C)

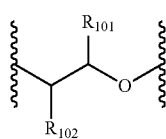
(C)

wherein $R_{101}$ and $R_{102}$ are independently selected from the group consisting of hydrogen, alkyl, hydroxyalkyl, aryl, alkoxyalkyl, and aryloxyalkyl;

(ii) divalent substituents conforming to the structure of Formula (CX)

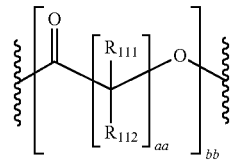
(CX)

wherein $R_{111}$ and $R_{112}$ are independently selected from the group consisting of hydrogen, hydroxyl, and $C_1$-$C_{10}$ alkyl, aa is an integer from 1 to 12, and bb is an integer greater than or equal to 1 (e.g., from 1 to 100);

(iii) divalent substituents conforming to the structure of Formula (CXX)

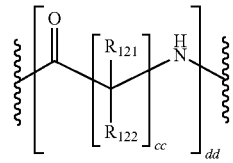
(CXX)

wherein $R_{121}$ and $R_{122}$ are independently selected from the group consisting of hydrogen, hydroxyl, and $C_1$-$C_{10}$ alkyl, cc is an integer from 1 to 12, and dd is an integer greater than or equal to 1 (e.g., from 1 to 100);

(iv) divalent substituents conforming to the structure of Formula (CXXX)

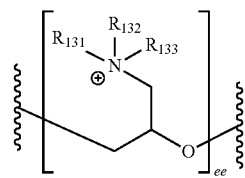
(CXXX)

wherein $R_{131}$, $R_{132}$, and $R_{133}$ are independently selected from alkyl and hydroxyalkyl, and ee is an integer greater than or equal to 1 (e.g., from 1 to 100);

(v) divalent substituents conforming to the structure of Formula (CXL)

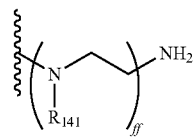
(CXL)

wherein each $R_{141}$ is independently selected from the group consisting of hydrogen and alkylamine groups, and ff is an integer greater than or equal to 1 (e.g., from 1 to 100);

(vi) divalent substituents conforming to the structure of Formula (CL)

(CL)

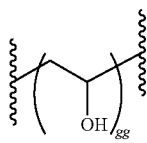

wherein gg is an integer greater than or equal to 1 (e.g., from 1 to 100);

(vii) divalent substituents conforming to the structure of Formula (CLX)

(CLX)

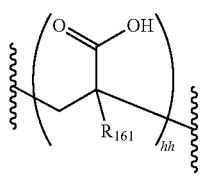

wherein each $R_{161}$ is independently selected from the group consisting of hydrogen and methyl, and hh is an integer greater than or equal to 1 (e.g., from 1 to 100);

(viii) divalent substituents conforming to the structure of Formula (CLXX)

(CLXX)

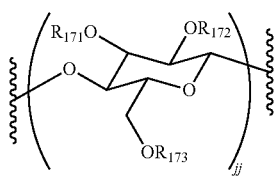

wherein each $R_{171}$, $R_{172}$, and $R_{173}$ is independently selected from the group consisting of hydrogen and —CH$_2$CO$_2$H, and jj is an integer greater than or equal to 1 (e.g., from 1 to 100); and (ix) divalent substituents comprising two or more substituents selected from the group consisting of substituents conforming to a structure of Formula (C), (CX), (CXX), (CXXX), (CXL), (CL), (CLX), or (CLXX).

2. The laundry care composition of claim 1, wherein $R_y$ is a divalent substituent conforming to a structure selected from the group consisting of Formulae (CA), (CB), and (CC)

(CA)

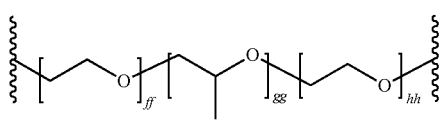

(CB)

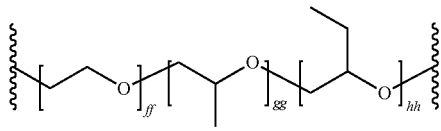

(CC)

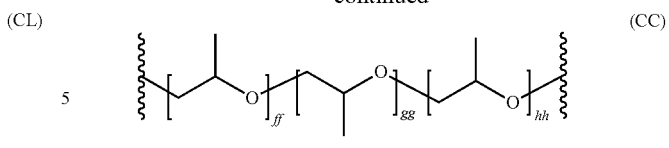

wherein ff, gg, and hh are selected from the group consisting of zero and positive integers, and the sum of ff, gg, and hh is 2 or more.

3. The laundry care composition of claim 1, wherein the compound conforming to the structure of Formulae (I) comprises at least one $R_a$ group.

4. A method for treating textile articles, the method comprising the steps of:

(a) providing the laundry care composition of claim 1;

(b) adding the laundry care composition to a liquid medium; and (c) placing the textile articles in the liquid medium.

5. The method of claim 4, wherein the method is performed under conditions sufficient to convert the compound conforming to the structure of Formulae (I) from an unconjugated form represented by the structure to a conjugated form.

6. The laundry care composition of claim 1, wherein $R_2$ and $R_3$ are selected from the group consisting of aryl groups, substituted aryl groups, heteroaryl groups, and substituted heteroaryl groups conforming to a structure of Formula (IA)— (IF) below (IA)

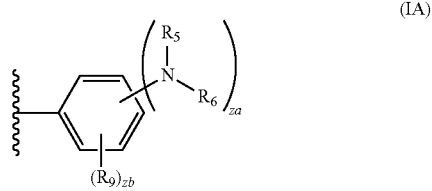

(IB)

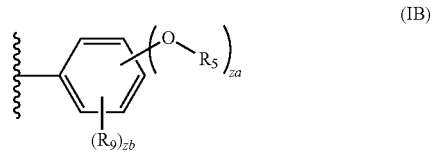

(IC)

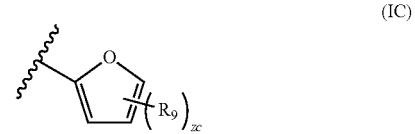

(ID)

(IE)

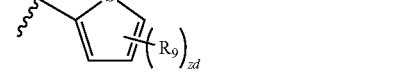

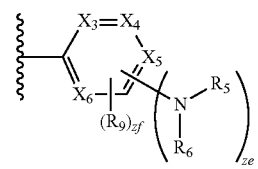

-continued

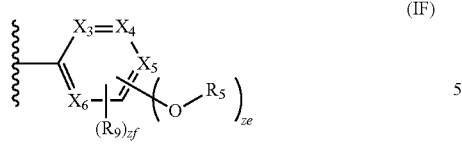
(IF)

wherein $R_9$ is selected from the group consisting of alkyl groups, substituted alkyl groups, aryl groups, substituted aryl groups, heteroaryl groups, substituted heteroaryl groups, a cyano group, halogens, —S(O)$_2$OH, —S(O)$_2$NR$_5$R$_6$, —C(O)OH, and —C(O)OR$_5$, provided two or more adjacent $R_9$ groups can be combined to form a fused ring structure; $X_3$, $X_4$, $X_5$, and $X_6$ are selected from the group consisting of a carbon atom and a nitrogen atom, provided (1) at least one of $X_3$, $X_4$, $X_5$, and $X_6$ is a nitrogen atom, (2) when $X_4$ is a nitrogen atom, then $X_3$ and $X_5$ are both carbon atoms and (3) when $X_3$ is a nitrogen atom, then $X_4$ is a carbon atom; the variables za and zb are independently selected from the group consisting of integers from 0 to 5, with the sum of za and zb being an integer from 0 to 5; the variables zc and zd are independently selected from the group consisting of integers from 0 to 3; the variables ze and zf are independently selected from the group consisting of integers from 0 to 4, with the sum of ze and zf being less than or equal to 5-N, where N is equal to the number of nitrogen atoms in the aromatic ring.

* * * * *